(12) United States Patent
Asselin et al.

(10) Patent No.: US 10,668,862 B2
(45) Date of Patent: Jun. 2, 2020

(54) VEHICLE INTERIOR COMPONENT

(71) Applicant: Shanghai Yanfeng Jinqiao Automotive Trim Systems Co. Ltd., Novi, MI (US)

(72) Inventors: Eric Charles Asselin, Holland, MI (US); Tyler T. Grab, Grand Rapids, MI (US); Rick Alan Anderson, Grand Haven, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 178 days.

(21) Appl. No.: 16/113,480

(22) Filed: Aug. 27, 2018

(65) Prior Publication Data

US 2018/0370446 A1    Dec. 27, 2018

Related U.S. Application Data

(63) Continuation of application No. PCT/US2017/019698, filed on Feb. 27, 2017.

(Continued)

(51) Int. Cl.
*B60R 13/00* (2006.01)
*B60R 7/04* (2006.01)
*B60R 7/08* (2006.01)

(52) U.S. Cl.
CPC ............... *B60R 7/04* (2013.01); *B60R 7/082* (2013.01)

(58) Field of Classification Search
CPC ... B65H 39/11; B65H 29/60; B65H 2408/111; Y10S 220/908; B30B 9/3046;

(Continued)

(56) References Cited

U.S. PATENT DOCUMENTS 4,368,937 A * 1/1983 Palombo ............... B64D 11/003
296/37.7
4,469,365 A * 9/1984 Marcus .................. B60R 7/082
224/311

(Continued)

OTHER PUBLICATIONS

The International Search Report and the Written Opinion of the International Searching Authority for International Patent Application No. PCT/US17/019698 dated May 24, 2017 (in English) (15 pages).

(Continued)

*Primary Examiner* — Kiran B Patel

(57) ABSTRACT

A console for a vehicle interior is disclosed. The console may comprise a base and a storage bin moveable between closed, released, open and intermediate positions. The bin may move from the intermediate position to both the open and closed positions. The bin may move from the intermediate to the closed position without first moving from the intermediate to the open position. The console may comprise a mechanism comprising a pin and a track comprising paths of movement for the pin to guide bin movement from the intermediate to the open and closed positions. The base may comprise a projection and the bin may comprise first and second protrusions or wall segments separated by a gap. The projection may travel through the gap as the bin moves from the intermediate to the open position. The console may comprise an overhead console providing a mirror directed to a rear seat.

20 Claims, 14 Drawing Sheets

Related U.S. Application Data

(60) Provisional application No. 62/302,166, filed on Mar. 1, 2016, provisional application No. 62/302,173, filed on Mar. 2, 2016, provisional application No. 62/305,524, filed on Mar. 8, 2016.

(58) Field of Classification Search
CPC .... B65F 2003/023; B65F 3/048; B65F 3/046; B60R 7/02; B64D 11/003
See application file for complete search history.

(56) References Cited

U.S. PATENT DOCUMENTS

| | | | | |
|---|---|---|---|---|
| 4,867,498 | A | 9/1989 | Delphia et al. | |
| 5,050,922 | A * | 9/1991 | Falcoff | B60R 7/04 224/311 |
| 5,267,761 | A | 12/1993 | Curtindale et al. | |
| 6,003,925 | A * | 12/1999 | Litke | B60R 7/04 16/319 |
| 6,062,623 | A * | 5/2000 | Lemmen | B60R 7/04 224/282 |
| 6,116,675 | A * | 9/2000 | Iwasawa | B60N 3/12 224/309 |
| 6,125,030 | A * | 9/2000 | Mola | B60R 7/04 16/357 |
| 6,126,221 | A * | 10/2000 | Kern | B60R 7/04 296/37.7 |
| 6,135,528 | A * | 10/2000 | Sobieski | B60R 7/04 224/311 |
| 6,231,099 | B1 * | 5/2001 | Greenwald | B60R 7/06 220/531 |
| 6,267,428 | B1 * | 7/2001 | Baldas | B60R 7/04 296/37.1 |
| 6,315,436 | B1 * | 11/2001 | Schenk | B60R 7/06 362/154 |
| 6,857,675 | B2 * | 2/2005 | Kurachi | B60R 7/06 224/483 |
| 7,084,932 | B1 * | 8/2006 | Mathias | B60R 11/0211 296/37.7 |
| 7,422,352 | B2 * | 9/2008 | Sakakibara | B60R 7/04 362/154 |
| 7,661,741 | B2 * | 2/2010 | Takai | B60R 7/04 296/37.1 |
| 8,371,539 | B2 * | 2/2013 | Hirota | G08C 17/02 248/27.1 |
| 8,439,418 | B1 * | 5/2013 | Lovejoy | B60R 7/06 296/37.12 |
| 8,562,058 | B1 * | 10/2013 | Kim | B60R 7/06 296/37.12 |
| 9,073,494 | B1 * | 7/2015 | Clark | B60R 7/082 |
| 9,174,571 | B2 * | 11/2015 | Carloni | B60R 7/06 |
| 9,573,520 | B1 * | 2/2017 | Salter | H05B 47/11 |
| 10,287,807 | B2 * | 5/2019 | Liu | B60R 7/06 |
| 2002/0134807 | A1 * | 9/2002 | Kim | B60N 3/102 224/542 |
| 2004/0066053 | A1 * | 4/2004 | Fero | B60R 7/06 296/37.8 |
| 2005/0134073 | A1 * | 6/2005 | Tokutomi | B60R 1/008 296/37.8 |
| 2007/0013202 | A1 * | 1/2007 | Tompson | B60R 7/04 296/37.1 |
| 2007/0133217 | A1 * | 6/2007 | Tiesler | B60R 13/0225 362/459 |
| 2007/0187968 | A1 * | 8/2007 | Vander Kuyl | B60R 7/04 296/24.34 |
| 2011/0175376 | A1 * | 7/2011 | Whitens | B60R 7/06 292/251.5 |
| 2011/0199182 | A1 * | 8/2011 | Catlin | B60N 3/106 340/5.7 |
| 2012/0230047 | A1 * | 9/2012 | Smith | B60R 7/04 362/543 |
| 2015/0197189 | A1 * | 7/2015 | Salter | B60R 11/00 362/510 |
| 2015/0360616 | A1 * | 12/2015 | Shami | B60R 7/06 296/37.8 |
| 2016/0229325 | A1 * | 8/2016 | Parlow | B60R 7/043 |
| 2017/0158142 | A1 * | 6/2017 | Oldani | B60R 7/06 |
| 2017/0313257 | A1 * | 11/2017 | Kang | B60R 7/04 |
| 2018/0118120 | A1 * | 5/2018 | Ferreira Orta | B60R 7/04 |
| 2018/0202202 | A1 * | 7/2018 | Celis Torres | B60R 5/04 |
| 2019/0023188 | A1 * | 1/2019 | Grab | B60R 7/082 |
| 2019/0337459 | A1 * | 11/2019 | Liu | E05F 5/06 |

OTHER PUBLICATIONS

Printout from Honda Sales Training 2019 Odyssey website: https://salestraining.honda.com/en/Odyssey-Family/2019-Odyssey/Vehicle-Details/Interior/Conversation-Mirror (last accessed Aug. 27, 2018) (1 page).

Printout from College Hills Honda: https://www.collegehillshonda.com/product/83250-SHJ.html (last accessed Aug. 25, 2018 (1 page).

* cited by examiner

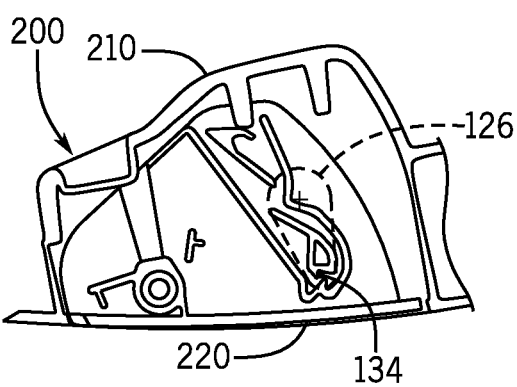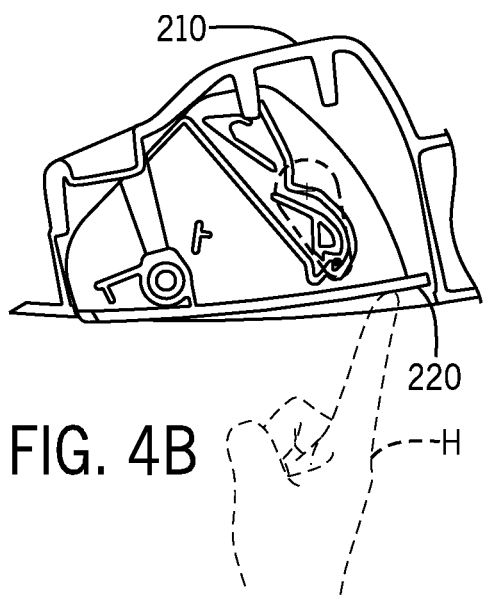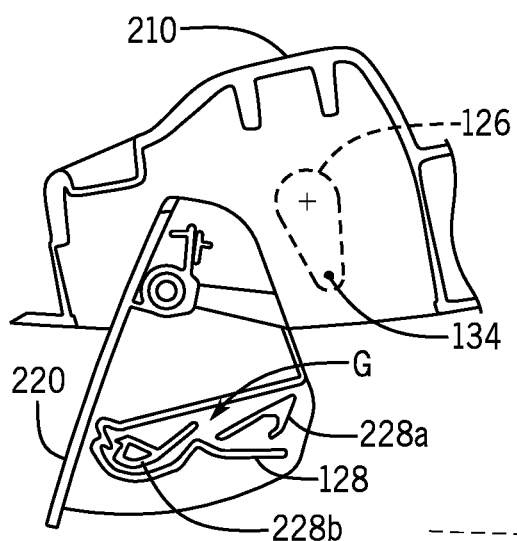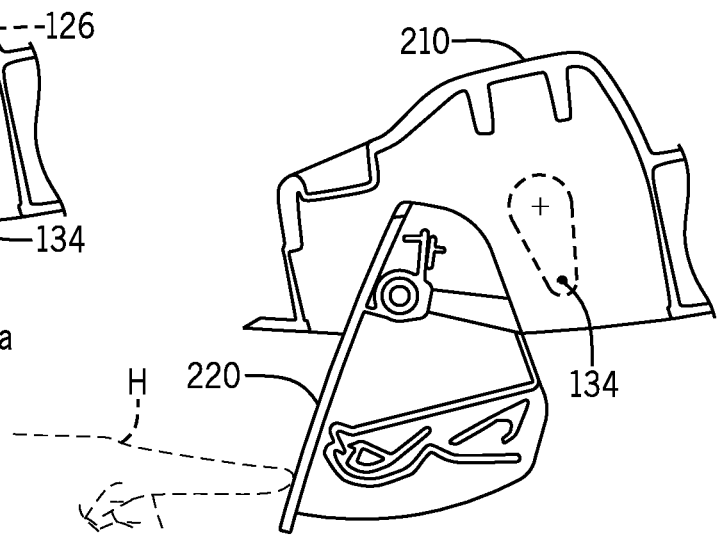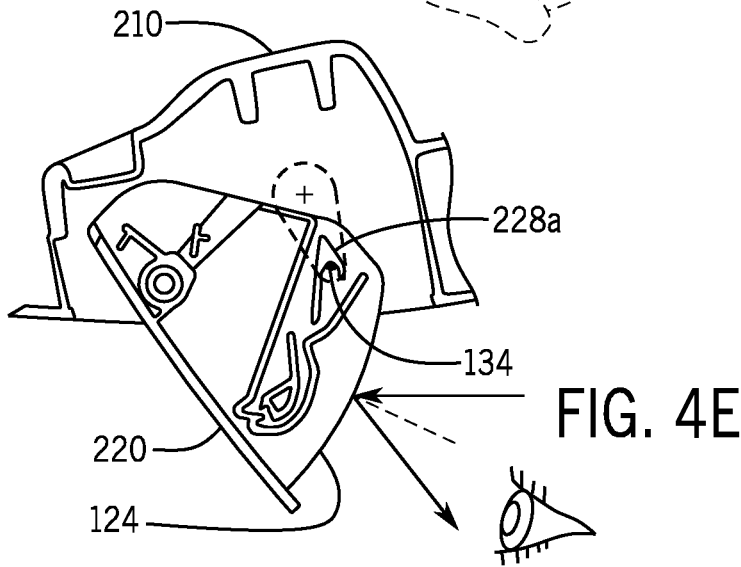

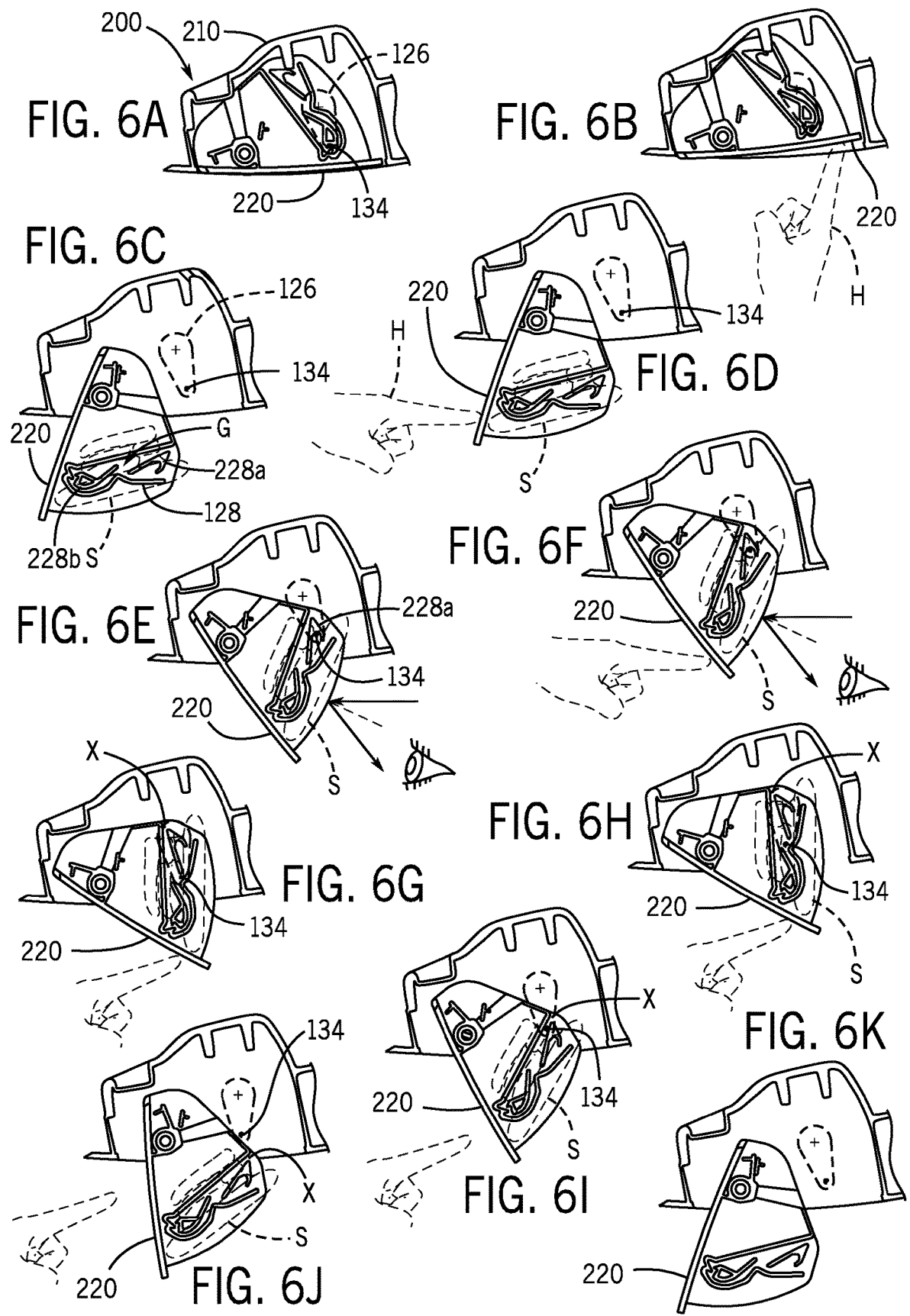

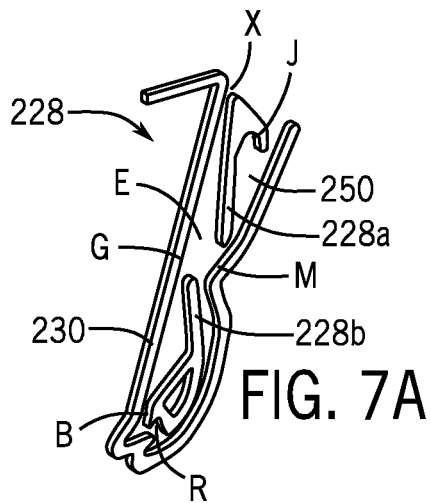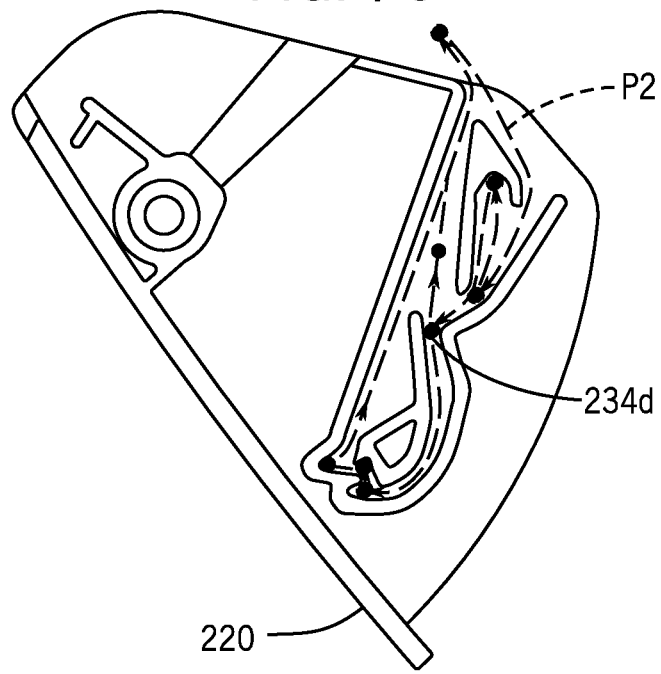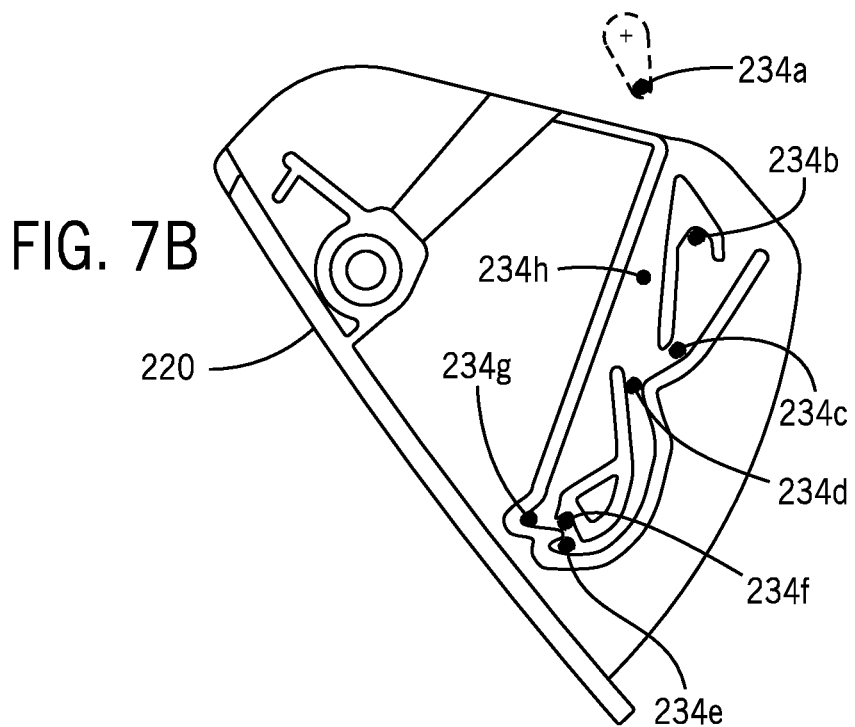

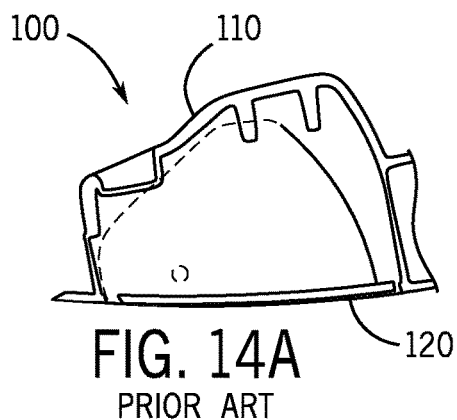
FIG. 14A
PRIOR ART
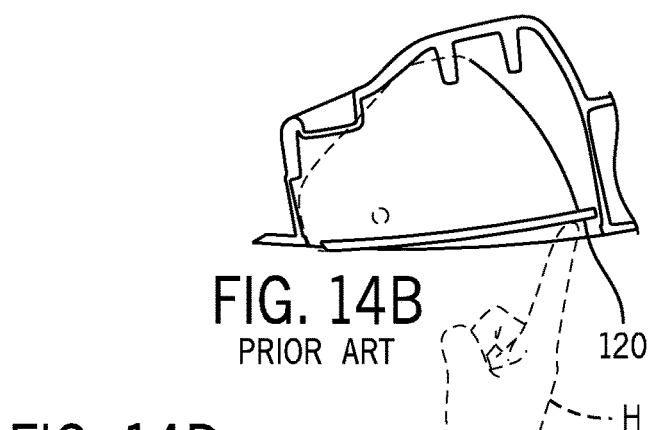
FIG. 14B
PRIOR ART
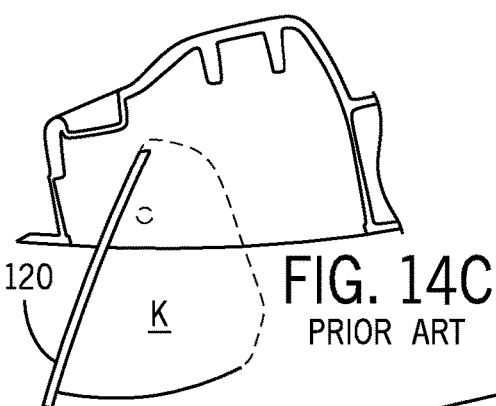
FIG. 14C
PRIOR ART
FIG. 14D
PRIOR ART
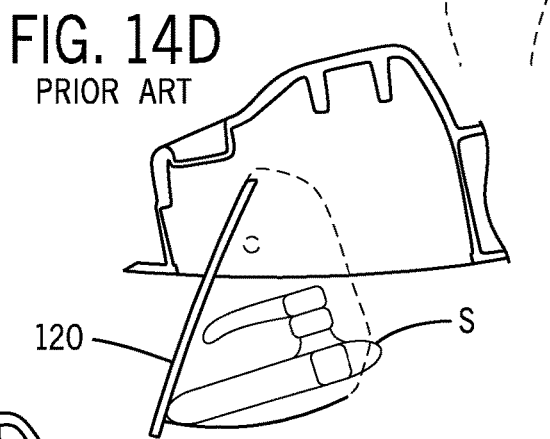
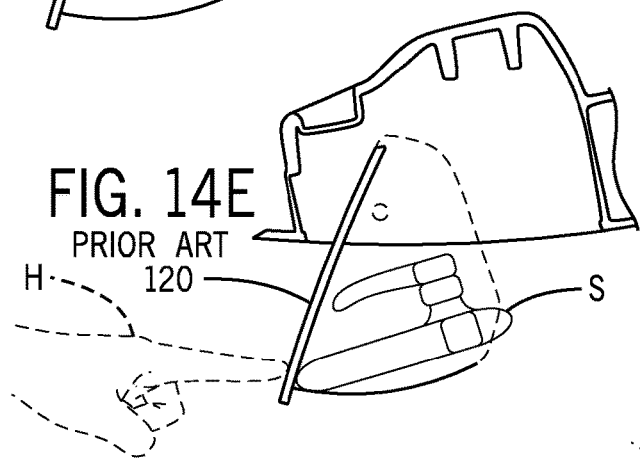
FIG. 14E
PRIOR ART
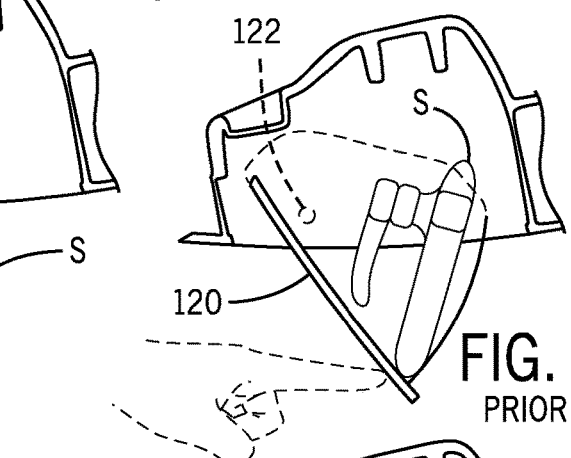
FIG. 14F
PRIOR ART
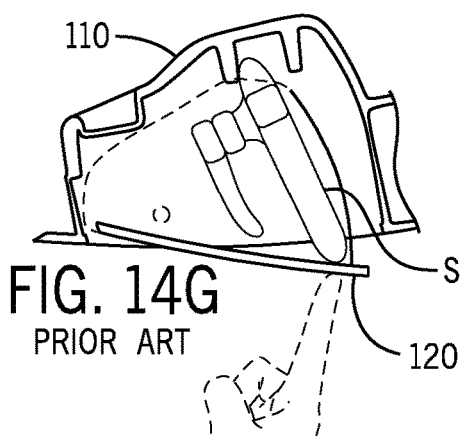
FIG. 14G
PRIOR ART
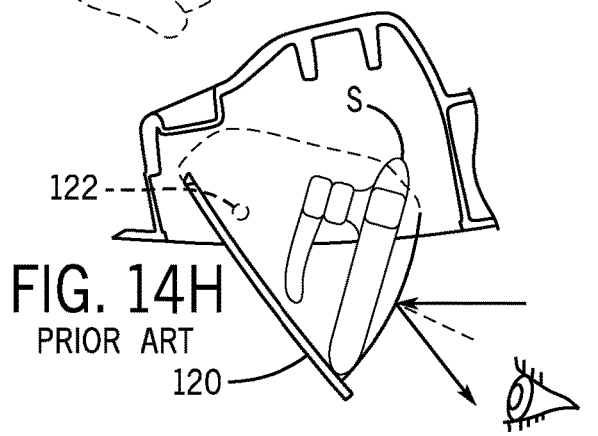
FIG. 14H
PRIOR ART

VEHICLE INTERIOR COMPONENT

CROSS-REFERENCE TO RELATED APPLICATIONS

The present application is a continuation of International/PCT Patent Application No. PCT/US2017/019698 titled "STORAGE COMPARTMENT FOR VEHICLE INTERIOR" filed Feb. 27, 2017, which claims the benefit of U.S. Provisional Patent Application Ser. No. 62/302,166 filed Mar. 1, 2016 entitled "STORAGE COMPARTMENT FOR VEHICLE INTERIOR," U.S. Provisional Patent Application Ser. No. 62/302,173 filed Mar. 2, 2016 entitled "STORAGE COMPARTMENT FOR VEHICLE INTERIOR," and U.S. Provisional Patent Application Ser. No. 62/305,524 filed Mar. 8, 2016 entitled "STORAGE COMPARTMENT FOR VEHICLE INTERIOR."

The present application claims priority to and incorporates by reference in full the following applications: (a) U.S. Provisional Patent Application No. 62/302,166 titled "STORAGE COMPARTMENT FOR VEHICLE INTERIOR" filed Mar. 1, 2016; (b) U.S. Provisional Patent Application No. 62/302,173 titled "STORAGE COMPARTMENT FOR VEHICLE INTERIOR" filed Mar. 2, 2016; (c) U.S. Provisional Patent Application No. 62/305,524 titled "STORAGE COMPARTMENT FOR VEHICLE INTERIOR" filed Mar. 8, 2016; (d) International/PCT Patent Application No. PCT/US2017/019698 titled "STORAGE COMPARTMENT FOR VEHICLE INTERIOR" filed Feb. 27, 2017.

FIELD

The present invention relates to a vehicle interior component. The present invention also relates to a retractable overhead storage compartment for a vehicle interior.

BACKGROUND

It is well-known for a vehicle interior to include a storage compartments for storing small personal articles and other items. For example, an overhead center console in a vehicle may include a retractable storage compartment suitable for storing sunglasses, driving glasses, keys, garage door openers, etc. Such storage compartments may have an access door that may rotate between an open position providing access to the interior storage area and a closed position enclosing the interior storage area. It is also generally known to provide a retractable overhead storage compartment having a conversation mirror secured on the exterior of the rotatable door. Such a conversation mirror may generally allow the driver or occupant in the front passenger seat to view the rear seat occupants.

Generally, known overhead storage compartments having a conversation mirror may have an intermediate conversation mirror position between the open and closed positions, where the mirror is accessible but the interior storage compartment is not. According to such known designs, opening the overhead storage compartment from the conversation mirror position requires the user to completely close the storage compartment door. In other words, known designs are unable to open directly from the mirror position. Further, when an object in the door does not allow the door to close fully, the door will simply return to the mirror position (not the closed position). Thus, when larger-sized objects such as larger sunglasses are placed into an overhead storage compartment with a conversation mirror, the door has been known to become stuck in or at the conversation mirror position. Such a condition may result in a vehicle occupant attempting to force the storage compartment door open (or closed) which may result in damage to components of the storage compartment.

It would be advantageous to provide for an improved storage compartment for a vehicle interior; it would also be advantageous to provide for an improved overhead storage compartment with a conversation mirror that may extend from an overhead console. It would further be advantageous to provide an improved storage compartment with an access door and conversation mirror that may open directly from the mirror position without first having to be closed. It would be further advantageous to provide a storage compartment that will not become stuck in the interior mirror position when larger-sized items are placed in the storage compartment.

SUMMARY

The present invention relates to a console for a vehicle interior comprising a base and a bin coupled to the base for movement to (1) a first state with the bin retained in a closed position; (2) a second state with the bin released from the closed position; (3) a third state with the bin in an open position providing access to a storage volume; (4) a fourth state with the bin retained in an intermediate position blocking access to the storage volume. The bin may be configured for movement (1) from the intermediate position to the open position and (2) from the intermediate position to the closed position. The bin may be configured for movement from the intermediate position to the closed position without first moving from the intermediate position to the open position. The console may comprise a mechanism to guide movement of the bin relative to the base. The mechanism may comprise a pin configured to travel in a track; the track may comprise (a) a first path of movement for the pin to guide the bin for movement from the intermediate position to the open position and (b) a second path of movement for the pin to guide the bin for movement from the intermediate position to the closed position. The base may comprise a projection and the bin may comprise a first protrusion and a second protrusion. The first protrusion may comprise a first wall segment and the second protrusion may comprise a second wall segment. A gap may be provided between the first wall segment and the second wall segment. The first wall segment and the second wall segment may comprise a guide for movement of the bin relative to the base. The projection may comprise a pin configured to travel through the gap as the bin moves from the intermediate position to the open position. The first protrusion may be configured to engage the pin to hold the bin in the closed position; the second protrusion may be configured to engage the pin to hold the bin in the intermediate position. The console may comprise an overhead console providing a mirror directed to a rear seat of the vehicle in the fourth state; the bin may comprise a compartment.

The present invention relates to a console for a vehicle interior comprising a base and a bin coupled to the base for movement to (1) a first state with the bin retained in a closed position; (2) a second state with the bin released from the closed position; (3) a third state with the bin in an open position providing access to a storage volume; (4) a fourth state with the bin retained in an intermediate position blocking access to the storage volume. The bin may be configured for movement (1) from the intermediate position to the open position and (2) from the intermediate position to the closed position. The base may comprise a pin; the bin may comprise a first protrusion configured to (a) engage the pin to hold the bin in the closed position and (b) engage the pin to hold the bin in the intermediate position and a second protrusion. The pin may be configured to travel between the first protrusion and the second protrusion as the bin moves from the intermediate position to the closed position. The pin may be configured to travel around the second protrusion as the bin moves from the open position to the intermediate position and then to the open position. The second protrusion is configured to guide movement of the pin away from the first protrusion to guide movement of the bin toward the open position.

The present invention relates to a console for a vehicle interior comprising a base and a bin coupled to the base for movement to (1) a first state with the bin retained in a closed position; (2) a second state with the bin released from the closed position; (3) a third state with the bin in an open position providing access to a storage volume; (4) a fourth state with the bin retained in an intermediate position blocking access to the storage volume. The bin may be configured for movement (1) from the intermediate position to the open position and (2) from the intermediate position to the closed position. The base may comprise a projection; the bin may comprise a first protrusion and a second protrusion. The first protrusion may comprise a wall segment and the second protrusion may comprise a block. A path of movement for the pin may be provided (1) along the wall segment and (2) between the wall segment and the block. The block may comprise a cam surface and the path of movement for the pin may be provided along the block.

The present invention relates to a console for a vehicle interior comprising a base and a bin coupled to the base for movement to (1) a first state with the bin retained in a closed position; (2) a second state with the bin released from the closed position; (3) a third state with the bin in an open position providing access to a storage volume; (4) a fourth state with the bin retained in an intermediate position blocking access to the storage volume. The bin may be configured for movement (1) from the intermediate position to the open position and (2) from the intermediate position to the closed position. The base may comprise a pin; the bin may comprise a wall segment with a notch and a block with a cam surface. The notch may comprise a catch for the pin. The wall segment may comprise a guide for the pin. The wall segment and the block may comprise a guide for movement of the bin relative to the base; the guide may comprise (a) a first path of movement for the pin along the wall segment into the notch to guide the bin to the intermediate position from the closed position relative to the base; (b) a second path of movement for the pin along the wall segment into the notch to guide the bin to the intermediate position from the open position relative to the base; (c) a third path of movement for the pin along the wall segment and along the cam surface of the block to guide the bin from the open position to the closed position relative to the base; (d) a fourth path of movement for the pin along the wall segment and along the cam surface of the block to guide the bin from the closed position to the open position.

The present invention relates to a console for a vehicle interior comprising a base and a bin coupled to the base for movement to (1) a first state with the bin retained in a closed position; (2) a second state with the bin released from the closed position; (3) a third state with the bin in an open position providing access to a storage volume; (4) a fourth state with the bin retained in an intermediate position blocking access to the storage volume. The bin may be configured for movement from the closed position to the open position, from the open position to the intermediate position and from the intermediate position to the open position. The bin may be configured to provide movement from the intermediate position to the closed position directly. Movement from the intermediate position to the closed position may not comprise movement to the open position. The console may comprise a mechanism to guide movement of the bin relative to the base; the mechanism may comprise a pin configured to travel in a track. The track may comprise (a) a first path of movement for the pin to guide the bin for movement from the intermediate position to the open position and (b) a second path of movement for the pin to guide the bin for movement from the intermediate position to the closed position. The base may comprise a projection. The bin may comprise a first protrusion and a second protrusion. The first protrusion may comprise a first wall segment and the second protrusion may comprise a second wall segment; a gap may be provided between the first wall segment and the second wall segment. The first wall segment and the second wall segment may comprise a guide for movement of the bin relative to the base. The projection may be configured to travel through the gap as the bin moves from the intermediate position to the open position. The base may comprise a projection; the bin may comprise a first protrusion and a second protrusion; the first protrusion may be configured to engage the projection to hold the bin in the closed position and the second protrusion may be configured to engage the projection to hold the bin in the intermediate position.

The present invention relates to a console for a vehicle interior comprising a base and a bin coupled to the base for movement to (1) a first state with the bin retained in a closed position; (2) a second state with the bin released from the closed position; (3) a third state with the bin in an open position providing access to a storage volume; (4) a fourth state with the bin retained in an intermediate position blocking access to the storage volume. The base may comprise a projection. The bin may comprise a first protrusion and a second protrusion. A gap may be provided between the first protrusion and the second protrusion. The projection may be configured to travel through the gap as the bin moves from the intermediate position to the open position. The first protrusion may be configured to engage the projection to retain the bin in the closed position and the second protrusion may be configured to engage the projection to retain the bin in the intermediate position. The projection may be configured for movement between (a) a disengaged position and (b) a first engaged position with the first protrusion and (c) a second engaged position with the second protrusion. The projection may be configured for movement from the second engaged position to the disengaged position directly without movement from the second engaged position to the first engaged position.

The present invention relates to a console for a vehicle interior. The console may comprise a base and a compartment coupled to the base for movement. Movement of the compartment may be between a first state with the compartment retained in a closed position, a second state with the compartment released from the closed position, a third state with the compartment in an open position providing access to a storage volume, and a fourth state with the compartment retained in an intermediate position blocking access to the storage volume. The compartment may be configured for movement from the intermediate position to the open position. The compartment may be configured for movement from the intermediate position to the open position without first moving from the intermediate position to the closed position. The compartment may be latched to the base in the first state and unlatched in the second state, in the third state, and in the fourth state. The console may further comprise a mirror directed to a rear seat of the vehicle in the fourth state. The console may further be an overhead console featuring a compartment comprising a sunglass holder. The console may further include a mechanism, such as a pin configured to travel in a track to guide movement of the compartment relative to the base. The mechanism may further comprise the track comprising an exit path for the pin.

The present invention also relates to vehicle interior that may be configured to contain an article. The vehicle interior may comprise a base, a cover for the base that may provide a compartment with a storage volume for the article, and a mechanism configured to guide the movement of the cover relative to the base. The cover may be movable relative to the base. Movement of the cover may be between a first state with the compartment retained in a closed position, a second state with the compartment released from the closed position, a third state with the compartment in an open position that may provide access to a storage volume, and a fourth state with the compartment retained in an intermediate position that may block access to the storage volume. The cover may further be configured to move from the intermediate position to the open position. The intermediate position of the vehicle interior may further provide a mirror surface configured to be externally visible. The mechanism configured to guide movement of the cover may comprise a track, a pin configured to travel in the track. The track my further comprise an exit path or an escape path for the pin.

The present invention also relates to a console for a vehicle interior. The console may comprise a base, a compartment coupled to the base and a track system comprising a feature that may guide movement of the compartment. The track system may be configured to guide movement of the compartment relative to the base to a first state with the compartment retained in a closed position, a second state with the compartment in an open position, and a third state with the compartment retained in an intermediate position. The feature may further comprise at least one of an opening in the track system, a protrusion, a tab or a switch. The track with the feature may additionally be configured to provide a first path configured to guide the compartment to move from the intermediate position to the closed position and a second path configured to guide the compartment to move from the intermediate position to the open position. The console may further comprise a pin configured to travel along the first path and the second path to guide movement of the compartment relative to the base. The console may also comprise a spring configured to move the compartment along the second path.

FIGURES

FIGS. 4A to 4E are schematic cross-section views of an overhead storage compartment with a door shown in different positions according to an exemplary embodiment.

FIGS. 6A to 6K are schematic cross-section views of an overhead storage compartment with a door shown in different positions according to an exemplary embodiment.

FIG. 7A is a schematic perspective view of a mechanism of an overhead storage compartment door according to an exemplary embodiment.

FIG. 7B is a schematic elevation view of a mechanism of an overhead storage compartment door according to an exemplary embodiment.

FIG. 7C is a schematic elevation view of an overhead storage compartment door showing a path of a mechanism according to an exemplary embodiment.

FIGS. 14A to 14H are schematic cross-section views of a conventional overhead storage compartment with the door shown in different positions.

DESCRIPTION

Figure 8A:
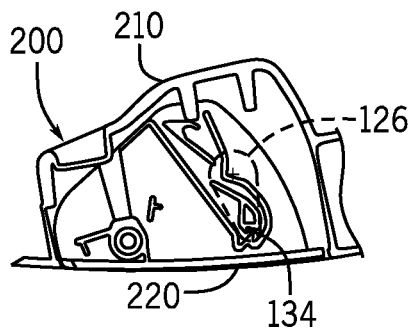
FIGS. 8A to 8B are schematic cross-section views of an overhead storage compartment with a door shown in different positions according to an exemplary embodiment.
Figure 8B:
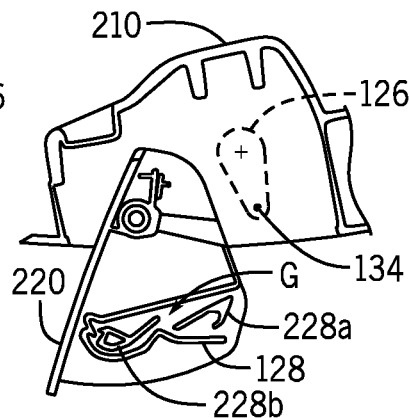
Figure 8C:
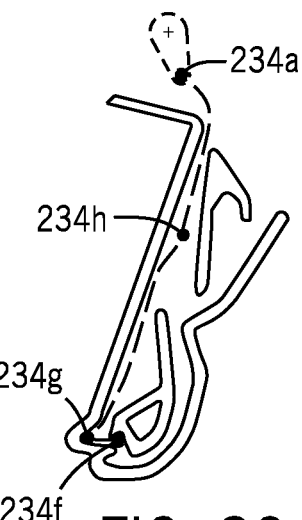
FIG. 8C is a schematic elevation view of a mechanism of an overhead storage compartment door according to an exemplary embodiment.
Figure 8D:
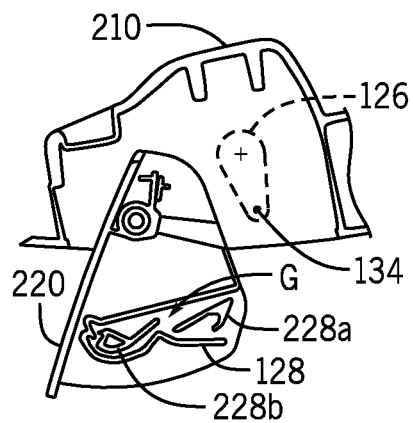
FIGS. 8D to 8E are schematic cross-section views of an overhead storage compartment with a door shown in different positions according to an exemplary embodiment.
Figure 8E:
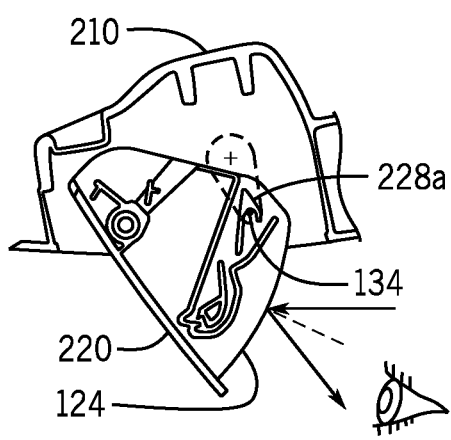
Figure 8F:
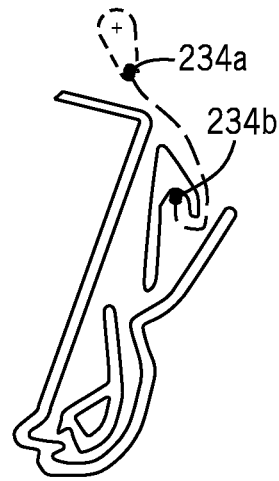
FIG. 8F is a schematic elevation view of a mechanism of an overhead storage compartment door according to an exemplary embodiment.
Figure 8G:
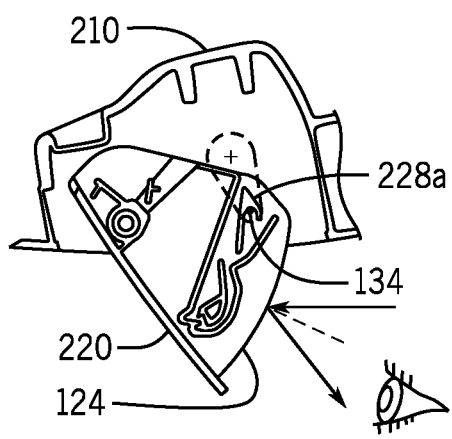
FIGS. 8G to 8H are schematic cross-section views of an overhead storage compartment with a door shown in different positions according to an exemplary embodiment.
Figure 8H:
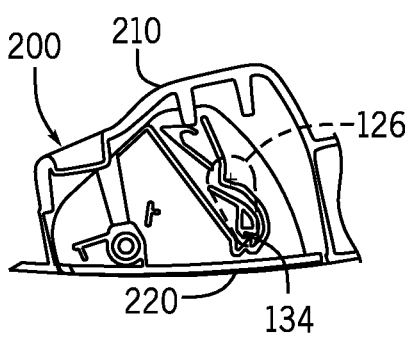
Figure 8I:
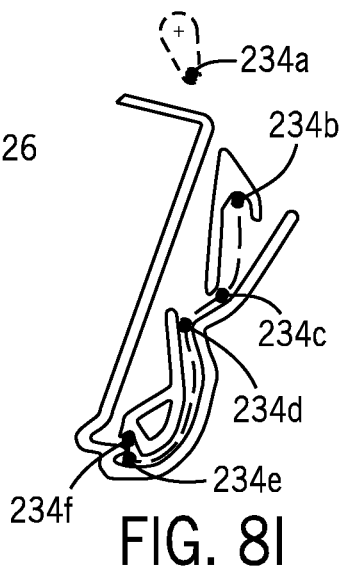
FIG. 8I is a schematic elevation view of a mechanism of an overhead storage compartment door according to an exemplary embodiment.
Figure 9A:
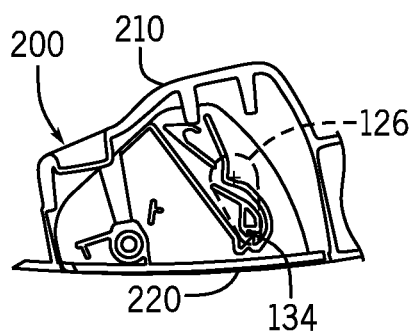
FIG. 9A to 9B are schematic cross-section views of an overhead storage compartment with a door shown in different positions according to an exemplary embodiment.
Figure 9B:
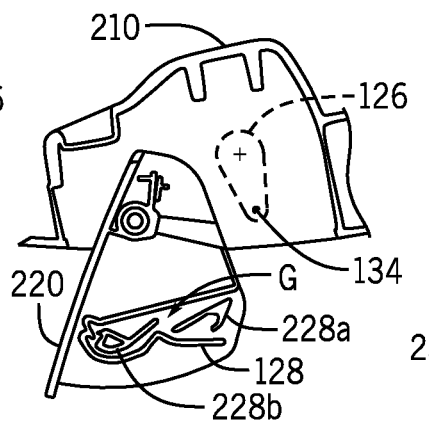
Figure 9C:
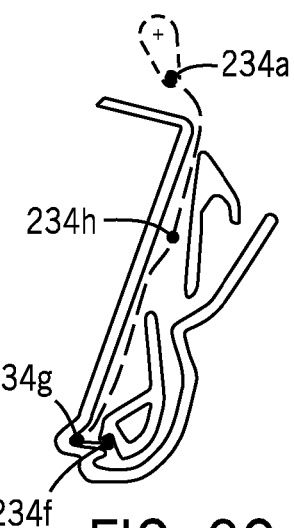
FIG. 9C is a schematic elevation view of a mechanism of an overhead storage compartment door according to an exemplary embodiment.
Figure 9D:
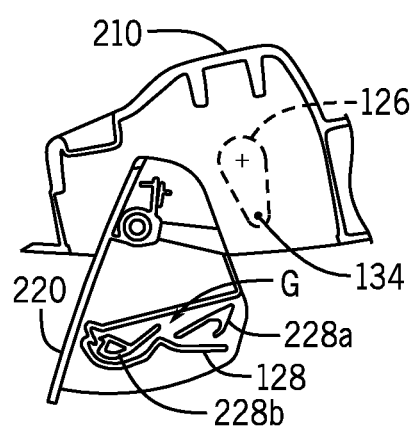
FIGS. 9D to 9E are schematic cross-section views of an overhead storage compartment with a door shown in different positions according to an exemplary embodiment.
Figure 9E:
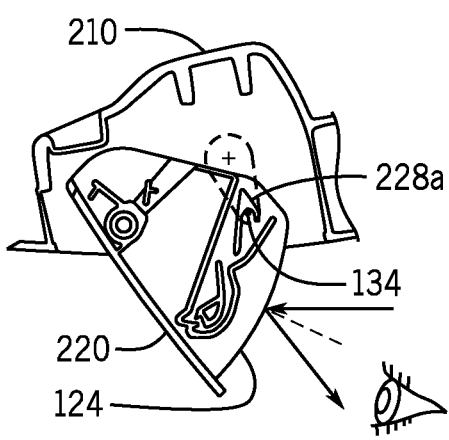
Figure 9F:
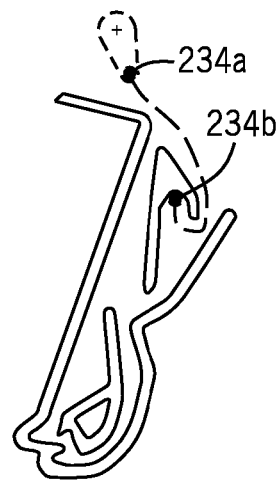
FIG. 9F is a schematic elevation view of a mechanism of an overhead storage compartment door according to an exemplary embodiment.
Figure 9G:
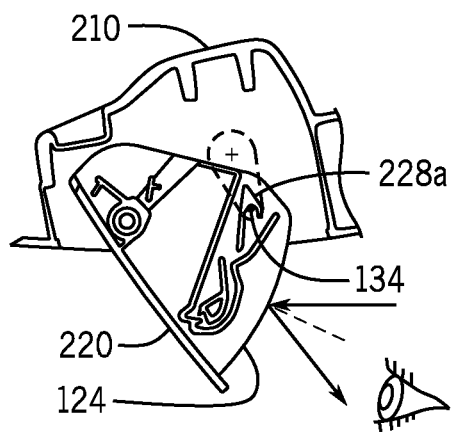
FIGS. 9G to 9H are schematic cross-section views of an overhead storage compartment with a door shown in different positions according to an exemplary embodiment.
Figure 9H:
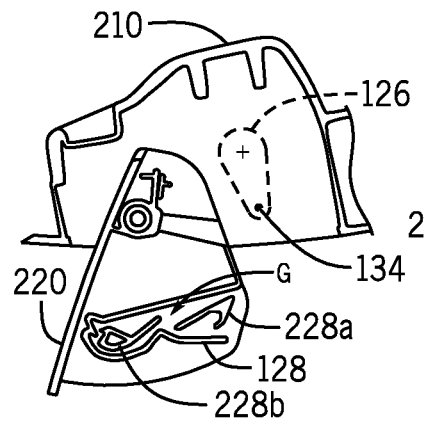
Figure 9I:
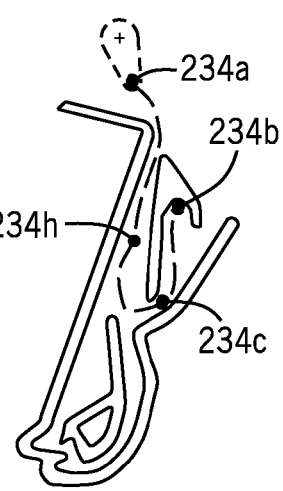
FIG. 9I is a schematic elevation view of a mechanism of an overhead storage compartment door according to an exemplary embodiment.

According to an exemplary embodiment as shown schematically in FIGS. 3A-3D, 4A-4E, 5A-5G, 6A-6K, 7A-7C, 8A-8I, 9A-9I, 10A-10C and 11A-11D, a console 200 for a vehicle interior may comprise a base 210 and a bin 220/320/420/520/620/720 coupled to base 210 for movement to (1) a first state with the bin retained in a closed position (see FIGS. 4A, 6A, 8A, 8H and 9A); (2) a second state with the bin released from the closed position (see FIGS. 4B and 6B); (3) a third state with the bin in an open position providing access to a storage volume (see FIGS. 4C, 4D, 5G, 6C, 6D, 6K, 8B, 8D, 9B, 9D and 9H); (4) a fourth state with the bin retained in an intermediate position blocking access to the storage volume (see FIGS. 4E, 5A, 6E, 6F, 8E, 8G, 9E and 9G). The bin may be configured for movement (1) from the intermediate position to the open position (see FIGS. 5A-5G, 6E-6K and 9G-9I) and (2) from the intermediate position to the closed position (see FIGS. 8G-8I). The bin may be configured for movement from the intermediate position to the closed position without first moving from the intermediate position to the open position (see FIGS. 8G-8I). Console 200 may comprise a mechanism to guide movement of bin 220/320/420/520/620/720 relative to base 210. The mechanism may comprise a pin or projection 134 configured to travel in a track 128/228; track 128/228 may comprise (a) a first path of movement for pin 134 to guide bin 220 for movement from the intermediate position to the open position (see FIGS. 9G-9I) and (b) a second path of movement for pin 134 to guide bin 220 for movement from the intermediate position to the closed position (see FIGS. 8G-8I).

According to an exemplary embodiment as shown schematically in FIGS. 3A-3D, 4A-4E, 5A-5G, 6A-6K, 7A-7C, 8A-8I and 9A-9I, base 210 may comprise a projection 134 and bin 220 may comprise a first protrusion 228*b* and a second protrusion 228*a*. First protrusion 228*b* may comprise a first wall segment and second protrusion 228*a* may comprise a second wall segment (see FIGS. 4C and 7C). A gap G may be provided between the first wall segment and the second wall segment (see FIGS. 4C and 7C). The first wall segment and the second wall segment may comprise a guide for movement of bin 220 relative to base 210. Projection 134 may comprise a pin configured to travel through gap G as bin 220 moves from the intermediate position to the open position (see FIGS. 5A-5G, 6E-6K and 9G-9I). First protrusion 228*b* may be configured to engage pin 134 to hold the bin in the closed position (see FIGS. 4A, 6A, 8A, 8H and 9A); second protrusion 228*a* may be configured to engage pin 134 to hold the bin in the intermediate position (see FIGS. 4E, 5A, 6E, 6F, 8E, 8G, 9E and 9G). Console 200 may comprise an overhead console providing a mirror directed to a rear seat of the vehicle in the fourth state; the bin may comprise a compartment.

Figure 10A:
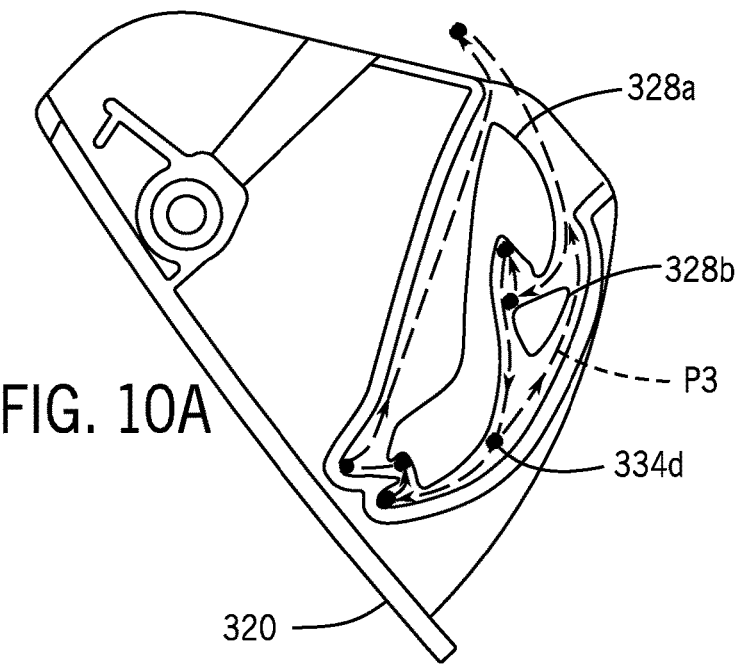
FIG. 10A is a schematic elevation view of an overhead storage compartment door showing a path of a mechanism according to an exemplary embodiment.
Figure 10B:
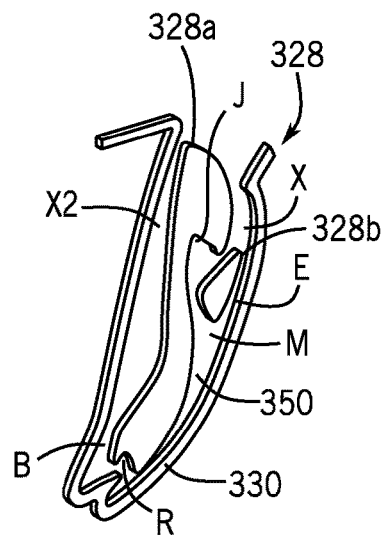
FIG. 10B is a schematic perspective view of the mechanism shown in FIG. 10A.
Figure 10C:
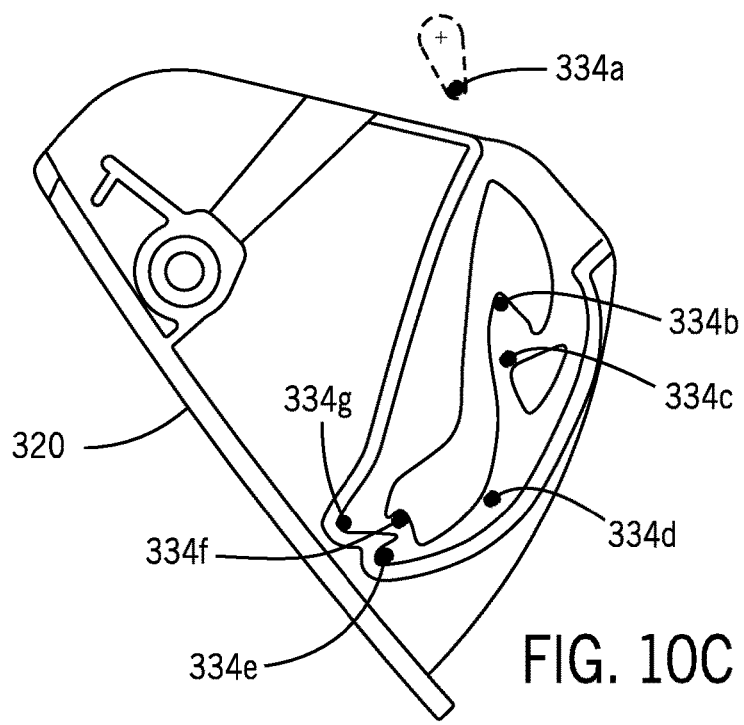
FIG. 10C is a schematic elevation view of a mechanism of an overhead storage compartment door according to an exemplary embodiment.

According to an exemplary embodiment as shown schematically in FIGS. 10A-10C, base 210 may comprise a pin 134; bin 320 may comprise a first protrusion 328*a* configured to (a) engage pin 134 to hold bin 320 in the closed position and (b) engage pin 134 to hold bin 320 in the intermediate position and a second protrusion 328*b*. Pin 134 may be configured to travel between first protrusion 328*a* and second protrusion 328*b* as bin 320 moves from the intermediate position to the closed position. Pin 134 may be configured to travel around second protrusion 328*b* as bin 320 moves from the open position to the intermediate position and then to the open position. Second protrusion 328*b* is configured to guide movement of pin 134 away from first protrusion 328*a* to guide movement of bin 320 toward the open position.

According to an exemplary embodiment as shown schematically in FIGS. 10A-10C, base 210 may comprise a pin or projection 134; bin 320 may comprise a first protrusion 328*a* and a second protrusion 328*b*. First protrusion 328*a* may comprise a wall segment and second protrusion 328*b* may comprise a block. A path of movement for pin 134 may be provided (1) along the wall segment and (2) between the wall segment and the block. The block may comprise a cam surface and the path of movement for pin 134 may be provided along the block.

According to an exemplary embodiment as shown schematically in FIGS. 10A-10C, base 210 may comprise a pin 134; bin 320 may comprise a wall segment 328*a* with a notch J/R and a block 328*b* with a cam surface. The notch may comprise a catch J/R for pin 134. The wall segment may comprise a guide for pin 134. The wall segment and the block may comprise a guide for movement of bin 320 relative to base 210; the guide may comprise (a) a first path of movement for the pin along the wall segment into the notch to guide the bin to the intermediate position from the closed position relative to the base; (b) a second path of movement for the pin along the wall segment into the notch to guide the bin to the intermediate position from the open position relative to the base; (c) a third path of movement for the pin along the wall segment and along the cam surface of the block to guide the bin from the open position to the closed position relative to the base; (d) a fourth path of movement for the pin along the wall segment and along the cam surface of the block to guide the bin from the closed position to the open position.

According to an exemplary embodiment as shown schematically in FIGS. 3A-3D, 4A-4E, 5A-5G, 6A-6K, 7A-7C, 8A-8I, 9A-9I, 10A-10C and 11A-11D, a console 200 for a vehicle interior may comprise a base 210 and a bin 220/320/420/520/620/720 coupled to base 210 for movement to (1) a first state with the bin retained in a closed position (see FIGS. 4A, 6A, 8A, 8H and 9A); (2) a second state with the bin released from the closed position (see FIGS. 4B and 6B); (3) a third state with the bin in an open position providing access to a storage volume (see FIGS. 4C, 4D, 5G, 6C, 6D, 6K, 8B, 8D, 9B, 9D and 9H); (4) a fourth state with the bin retained in an intermediate position blocking access to the storage volume (see FIGS. 4E, 5A, 6E, 6F, 8E, 8G, 9E and 9G). The bin may be configured for movement from the closed position to the open position (see FIGS. 4A-4C, 6A-6C, 8A-8C and 9A-9C), from the open position to the intermediate position (see FIGS. 4C-4E, 6C-6E, 8D-8F and 9D-9F) and from the intermediate position to the open position (see FIGS. 5A-5G, 6E-6K and 9G-9I). The bin may be configured to provide movement from the intermediate position to the closed position directly (see FIGS. 8G-8I). Movement from the intermediate position to the closed position may not comprise movement to the open position. Console 200 may comprise a mechanism to guide movement of bin 220/320/420/520/620/720 relative to the base 210; the mechanism may comprise a pin 134 configured to travel in a track 128/228. Track 128/228 may comprise (a) a first path of movement for pin 134 to guide bin 220 for movement from the intermediate position to the open position (see FIGS. 9G-9I) and (b) a second path of movement for the pin to guide the bin for movement from the intermediate position to the closed position (see FIGS. 8G-8I).

According to an exemplary embodiment as shown schematically in FIGS. 3A-3D, 4A-4E, 5A-5G, 6A-6K, 7A-7C, 8A-8I and 9A-9I, the base may comprise a projection 134. Bin 220 may comprise a first protrusion 228*b* and a second protrusion 228*a*. First protrusion 228*b* may comprise a first wall segment and second protrusion 228*a* may comprise a second wall segment; a gap G may be provided between the first wall segment and the second wall segment. The first wall segment and the second wall segment may comprise a guide for movement of bin 220 relative to base 210. Projection 134 may be configured to travel through gap G as bin 220 moves from the intermediate position to the open position (see FIGS. 5A-5G, 6E-6K and 9G-9I). First protrusion 228*b* may be configured to engage projection 134 to hold bin 220 in the closed position (see FIGS. 4A, 6A, 8A, 8H and 9A) and second protrusion 228*a* may be configured to engage projection 134 to hold the bin in the intermediate position (see FIGS. 4E, 5A, 6E, 6F, 8E, 8G, 9E and 9G).

According to an exemplary embodiment as shown schematically in FIGS. 3A-3D, 4A-4E, 5A-5G, 6A-6K, 7A-7C, 8A-8I, 9A-9I, 10A-10C and 11A-11D, a console 200 for a vehicle interior may comprise a base 210 and a bin 220/320/420/520/620/720 coupled to base 210 for movement to (1) a first state with the bin retained in a closed position (see FIGS. 4A, 6A, 8A, 8H and 9A); (2) a second state with the bin released from the closed position (see FIGS. 4B and 6B); (3) a third state with the bin in an open position providing access to a storage volume (see FIGS. 4C, 4D, 5G, 6C, 6D, 6K, 8B, 8D, 9B, 9D and 9H); (4) a fourth state with the bin retained in an intermediate position blocking access to the storage volume (see FIGS. 4E, 5A, 6E, 6F, 8E, 8G, 9E and 9G). Base 210 may comprise a projection 134. Bin 220 may comprise a first protrusion 228*b* and a second protrusion 228*a*. A gap G may be provided between first protrusion 228*b* and second protrusion 228*a*. Projection 134 may be configured to travel through gap G as bin 220 moves from the intermediate position to the open position. First protrusion 228*b* may be configured to engage projection 134 to retain bin 220 in the closed position and second protrusion 228*a* may be configured to engage projection 134 to retain bin 220 in the intermediate position. Projection 134 may be configured for movement between (a) a disengaged position (see FIGS. 4C, 4D, 5G, 6C, 6D, 6K, 8B, 8D, 9B, 9D and 9H) and (b) a first engaged position with the first protrusion (see FIGS. 4A, 6A, 8A, 8H and 9A) and (c) a second engaged position with the second protrusion (see FIGS. 4E, 5A, 6E, 6F, 8E, 8G, 9E and 9G). Projection 134 may be configured for movement from the second engaged position to the disengaged position directly without movement from the second engaged position to the first engaged position (see FIGS. 5A-5G, 6E-6K and 9G-9I).

Exemplary Embodiments

Figure 1A:
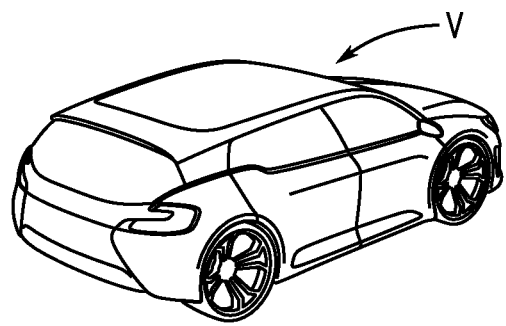
FIG. 1A is a schematic perspective view of a vehicle according to an exemplary embodiment.
Figure 1B:
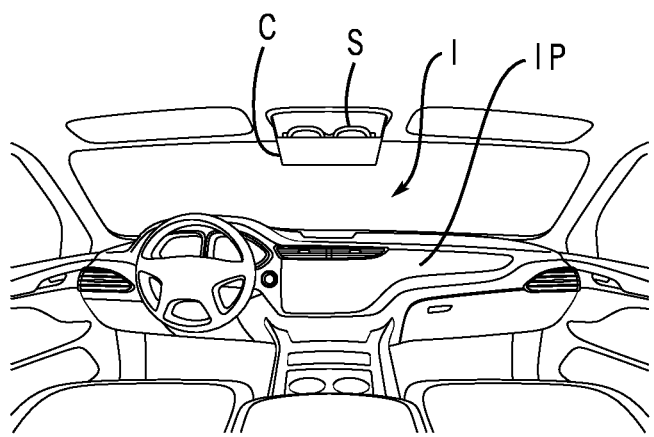
FIG. 1B is a schematic elevation view of a vehicle interior according to an exemplary embodiment.
Figure 1C:
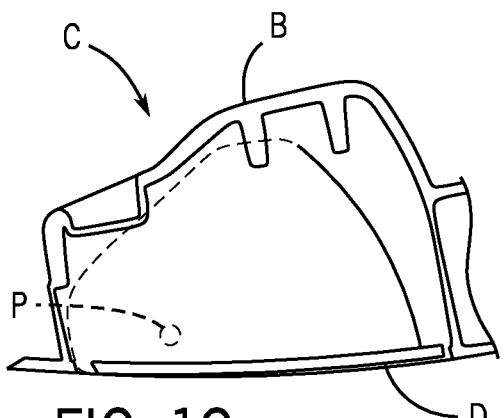
FIGS. 1C to 1E are schematic cross-section views of an overhead storage compartment with the door shown in different positions according to an exemplary embodiment.
Figure 1D:
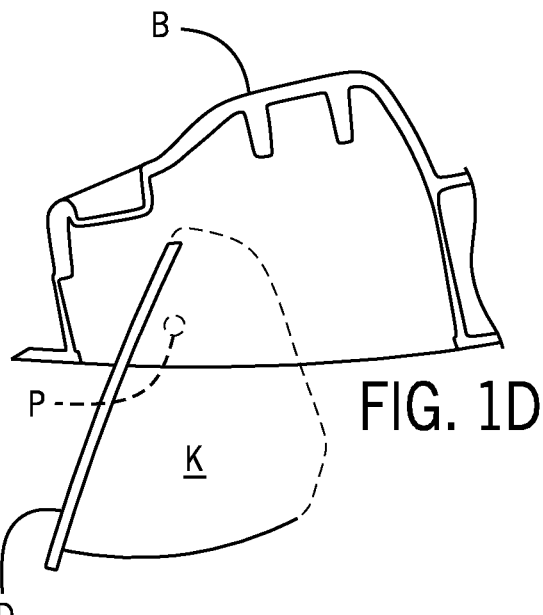
Figure 1E:
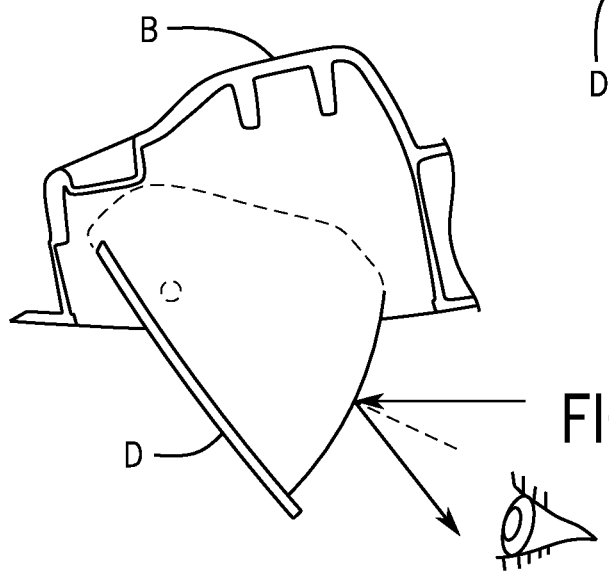
Figure 2A:
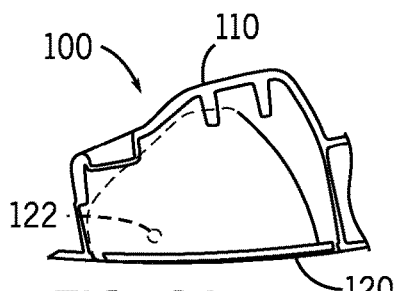
FIGS. 2A to 2J are schematic cross-section views of an overhead storage compartment with the door shown in different positions according to an exemplary embodiment.
Figure 2B:
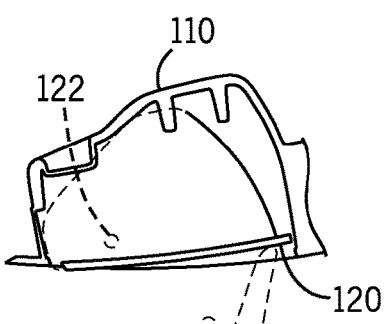
Figure 2C:
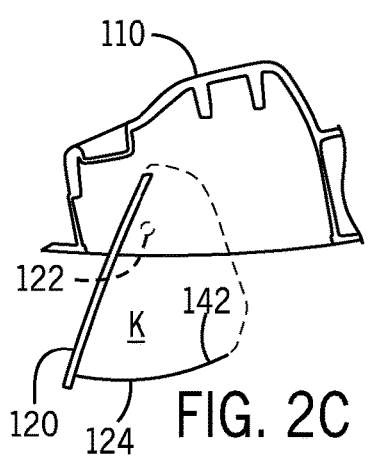
Figure 2D:
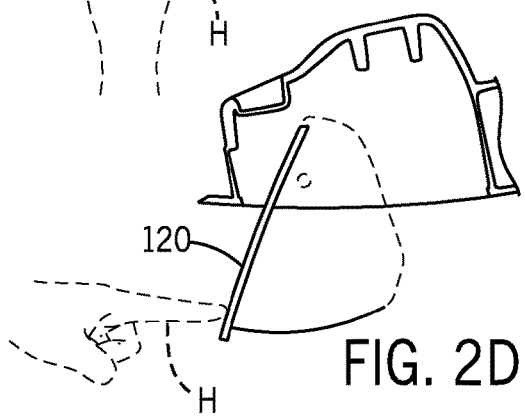
Figure 2E:
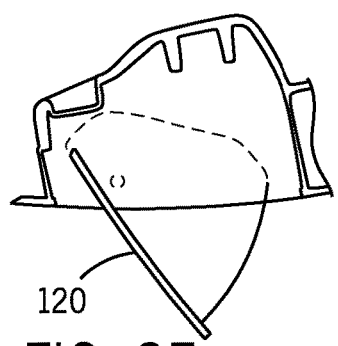
Figure 2F:
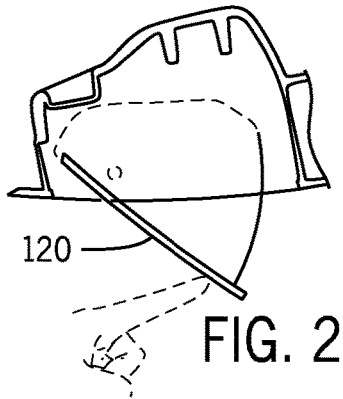
Figure 2G:
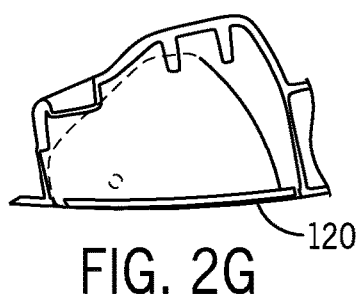
Figure 2H:
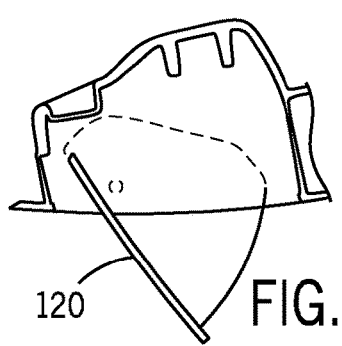
Figure 2I:
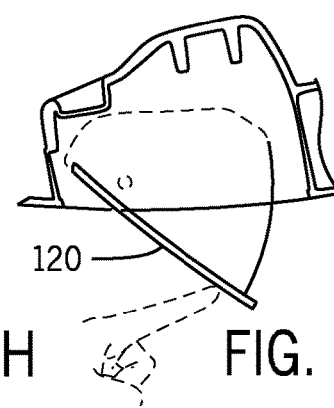
Figure 2J:
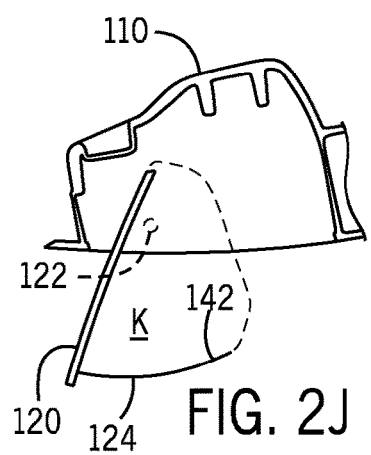

As shown schematically in FIGS. 1A and 1B, a vehicle V is shown having an interior I including an instrument panel IP and an overhead storage compartment or console 100 according to an exemplary embodiment. As shown schematically in FIGS. 1A and 1B, compartment 100 may be located in the interior of vehicle interior I (or an overhead console) above the front windshield and instrument panel IP. Compartment 100 may further be substantially centered between the front row seats of vehicle interior I as shown in FIG. 1B and may be configured to receive and stow articles such as sunglasses S.

Figure 3A:
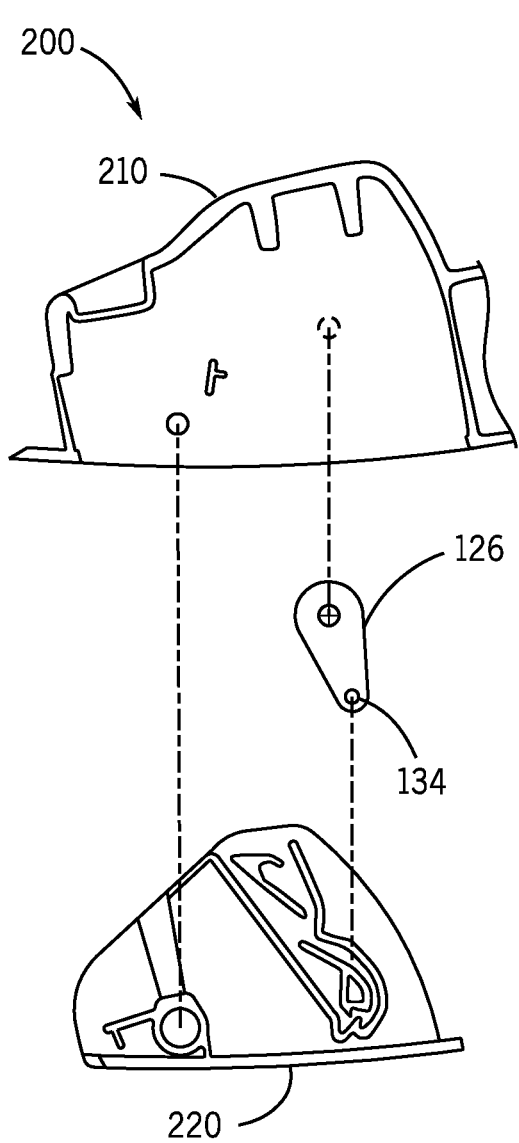
FIG. 3A is a schematic exploded view of an overhead storage compartment according to an exemplary embodiment.

As shown schematically in FIG. 3A, a console 200 is shown having a base 210, hinge 126 and compartment such as door 220 according to an exemplary embodiment. As shown schematically in FIG. 3B, base 210 according to an exemplary embodiment may be comprised of an exterior housing having at least one side panel and an open bottom for accessing a storage compartment.

As shown schematically in FIG. 3A, a mechanism may be provided to guide movement of the compartment or door 220 relative the base 210. The mechanism may include a track on door 220 and hinge 126 with a guide pin for traveling within the track. Hinge 126 may have a head portion and an arm integrally extending from the head portion. A guide pin 134 may extent axially from the end of hinge 126 opposite the head portion. Hinge 126 may be pivotably mounted on an interior surface of a side panel of base 210 so that guide pin 134 extends inwardly into the interior compartment of base 210.

As shown schematically in FIG. 3A, compartment or door 220 may have a bottom face panel and an open end opposite the face panel. Door 220 may additionally comprise a rear panel extending outwardly from the face panel. A conversation mirror may be secured to the exterior surface of the rear panel. According to the exemplary embodiment shown schematically in FIG. 3A, the outer surface of a side panel of door 220 may include a track system including a track 128 to engage and guide movement of guide pin 134 of hinge 126 upon movement or rotation of door 220 relative base 210. Door 220 may additionally comprise an interior storage volume adjacent the side wall and rear panel for receiving and holding items such as sunglasses, keys, etc. Such articles may be at least partially secured within the interior compartment by the rear panel. The interior storage volume may be accessible from the open end of door 220 opposite the bottom face panel.

Figure 3B:
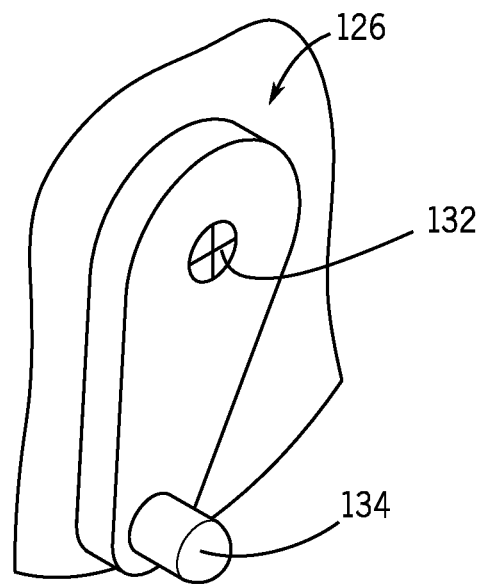
FIGS. 3B to 3D are schematic perspective views of a hinge mechanism according to an exemplary embodiment.
Figure 3C:
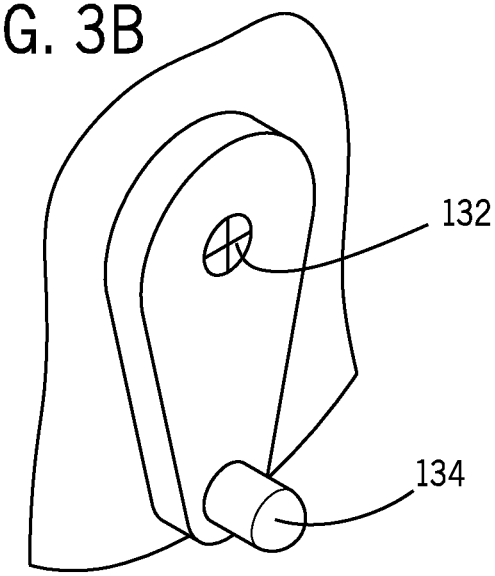
Figure 3D:
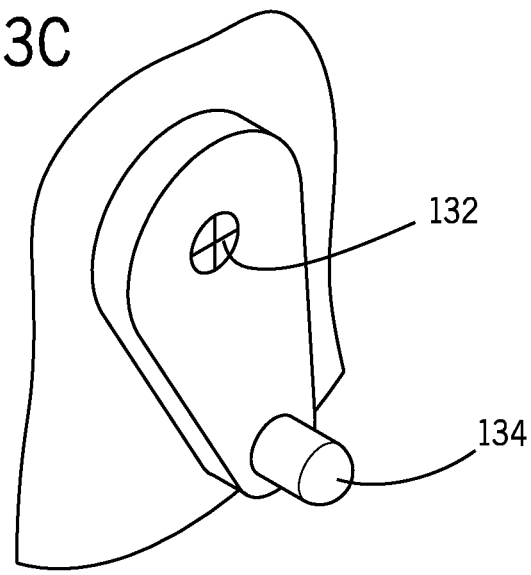

As shown schematically in FIGS. 3B through 3D, detail views of hinge 126 is shown according to an exemplary embodiment. As shown schematically in FIGS. 3B through 3D, the head portion of hinge 126 may comprise a pivot point 132 upon which hinge 126 may pivot or rotate relative base 210. As shown schematically in FIGS. 3B through 3D, hinge 126 may have a tapered arm extending from the head portion where pivot point 132 is located. As shown schematically in FIGS. 3B through 3D, guide pin 134 according to an exemplary embodiment may axially extend from the end of hinge 126 opposite the head portion. As shown schematically in FIGS. 3B through 3D, guide pin 134 according to an exemplary embodiment may have a generally cylindrical shape and have opposing ends, including an end attached to hinge 126 and an opposite free end.

According to the exemplary embodiment shown in FIGS. 3B through 3D, hinge 126 may pivot around pivot point 132 with guide pin 134 rotating between opposing terminal points along a generally arcuate range of motion. For example, FIG. 3B shows hinge 126 in a position with the arm extending in a forward position and guide pin 134 in a first terminal position. FIG. 3D shows hinge 126 in a rearward position and guide pin 134 in a second terminal position opposite the first terminal position shown in FIG. 3B. FIG. 3C shows hinge 126 in an intermediate position between the positions illustrated in FIGS. 3B and 3D. Thus, as shown schematically in FIGS. 3B through 3D, hinge 126 may rotate around pivot point with guide pin 134 rotating along an arc-shaped path.

According to the exemplary embodiment shown in FIGS. 3B through 3D, hinge 126 may be held generally stationary in different positions, including the positions shown in FIGS. 3B through 3D, by friction at pivot joint 132 and may require influence from the track on door 220 to move or pivot. For example, movement of door 220 relative base 210 may cause the track on door 220 to engage and direct guide pin 134, with the outer edge of track 128 and edges of raised protrusions such as interior formations within track moving along guide pin 134. Such movement may cause hinge 126 to pivot forward and backward along its generally arcuate range of motion as track 128 moves along guide pin 134.

As shown schematically in FIGS. 4A through 4E, compartment or door 220 of console 200 is shown in a sequence of different positions according to an exemplary embodiment. In particular, FIGS. 4A through 4E illustrate rotational movement of door 220 of console 200 from a first state or closed position as shown in FIG. 4A to fourth state or intermediate position shown in FIG. 4E where the conversation mirror on the rear panel of door 220 is viewable and access to the interior storage volume is blocked. As shown schematically in FIGS. 4A through 4E, door 220 according to an exemplary embodiment may be rotationally mounted to base 210 with door 220 being able to rotate relative the base 210. According to an exemplary embodiment as shown in FIGS. 4A through 4E, a mechanism may be provided to guide movement of the compartment or door 220 relative the base 210. The mechanism may include a track on door 220 and hinge 126 with a guide pin for traveling within the track As shown schematically in FIG. 4A, console 200 is shown in a first state or closed position according to an exemplary embodiment with door 220 being fully retained within base 210. In this position, door 220 is configured to fit within the interior compartment of base 210. According to the exemplary embodiment shown in FIG. 4A, when console 200 is in the closed position, the guide pin may be seated within a bottom portion of the track on door 220 against a downward-extending catch formed along the bottom edge of a raised interior formation. Engagement of the guide pin in this position may retain door 220 in the closed position within base 210 and prevent door 220 from opening downward.

As shown schematically in FIG. 4B, door 220 is shown in a second state being manually pushed upward from the position shown in FIG. 4A by hand H. As shown schematically in FIG. 4B, the bottom face panel of door 220 may be pushed upward, and according to an exemplary embodiment, door 220 may rotate slightly upward within the interior compartment of base 210. In the position shown schematically in FIG. 4B, the track system on the exterior surface of the side panel of door 220 may, according to an exemplary embodiment, move upward relative the hinge secured to the interior side panel of stationary base 210.

As shown schematically in FIG. 4B, upward movement of door 220 may disengage the guide pin from the hinge along the lower portion of the raised interior formation of the track, with the guide pin being directed into a groove on the bottom edge of the track. Engagement of the guide pin within the grove at the bottom edge of the track on door 220 may restrict further upward movement of door 220 within base 210. From this position, withdrawing upward force on door 220 from hand H may actuate the opening of console 200 by permitting the track to move in a downward direction relative the guide pin, with door 220 reciprocally rotating downward relative base 210.

As shown schematically in FIG. 4C, console 200 is shown in a third state or open position according to an exemplary embodiment. As shown schematically in FIG. 4C, the free end of door 220, opposite the pivot point has rotated downward and is fully extended from base 210. In this position, items may be placed within a storage volume within the interior portion of door 220. In the open position shown in FIG. 4C, the track on door 220 has descended from the position shown in FIG. 4B and may be fully disengaged from the hinge and guide pin. A spring may additionally provide a force to hold door 220 at the fully opened position when the pin is separated from the track. (A damper may also be provided to even/control opening motion of the door 220.) The spring rate of the spring and the damping ratio of the damper may be selected to control/fit the intended range of movement of door 220.

As shown schematically in FIG. 4C, the track 128 on door 220 may be directed around guide pin 134 and may disengage from the guide pin 134 through an opening in the top of the track system. For example, the track may comprise a slotted channel (defined by the side edges of the track perimeter and edges of raised interior formations 228*a*, 228*b*) which may slide around the guide pin 134. According to the exemplary embodiment shown schematically in FIG. 4C, the track 128 may include a gap G between raised interior formations 228*a*, 228*b* and the open top end may provide an exit path for the track to descend along the guide pin 134 until it disengages from guide pin 134 through the opening in the top of the track system.

As shown schematically in FIG. 4D, door 220 of console 200 is shown in the open position and being pushed by hand H. As shown schematically in FIG. 4C, door 220 according to an exemplary embodiment may be moved from the open and/or fully extended position by manually pushing the free end of door 220 in a direction towards base 210. The manual force exerted upon door 220 by a finger may overcome resistance from a spring and/or damper urging door 220 toward the open position. With door 220 being rotatably connected to base 210, pushing the free end of door 220 in the manner shown in FIG. 4C may cause door 220 to rotate upwards and back toward the open end of base 210 (in substantially the opposite arcuate direction of rotation from which door 220 descended). As the free end door 220 is rotated upward and approaches base 210, the track on the side of door 220 may engage the guide pin on the hinge through the opening in the top of the track system, with the slotted channel of the track receiving the guide pin.

As shown schematically in FIG. 4E, the console is shown in a fourth state or intermediate mirror position according to an exemplary embodiment. As shown schematically in FIG.

4E, when the console is retained in the intermediate position, door 220 may partially extend from base 210 with mirror surface 124 on the exterior surface of the rear panel of door 220 being exposed and viewable to the driver or other occupants seated in the vehicle. As shown schematically in FIG. 4E, where door 220 is in the intermediate position access to the storage volume may be blocked. Door 220 may be moved from the open position shown in FIG. 4D to the intermediate position shown schematically in FIG. 4E by pushing door 220 in the manner shown in FIG. 4D.

As shown schematically in FIG. 4E, when the console is in the intermediate position, the track on door 220 may be hooked on the guide pin of the hinge. For example, according to an exemplary embodiment as shown schematically in FIG. 4E, upper raised interior formation 228*a* of track 128 may comprise an inverted hook configuration which may engage and catch the guide pin. Thus, as door 220 is rotated upward from the open position shown in FIG. 4D, the track on door 220 may engage the guide pin through the open top end of the track system, and raised interior formation 228*a* may pass along the guide pin until the guide pin engages the hook. Engagement of the guide pin in the location shown in FIG. 4E may retain door 220 in the intermediate mirror position and prevent door 220 from rotating downward from base 210 under the force of gravity.

As shown schematically in FIGS. 5A through 5G, compartment or door 220 of console 200 is shown in a sequence of different positions according to an exemplary embodiment. In particular, FIGS. 5A through 5E show rotational movement of door 220 from the fourth state or intermediate position shown in FIG. 5A to the third state or open position shown in FIG. 5G. According to the exemplary embodiment shown in FIGS. 5A through 5G, a track system on the side panel of door 220 is configured to guide movement of the compartment or door relative the base 210.

Figure 5A:
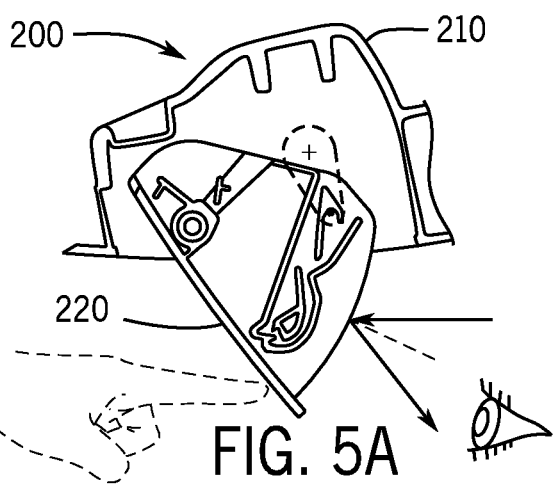
FIGS. 5A to 5G are schematic cross-section views of an overhead storage compartment with a door shown in different positions according to an exemplary embodiment.

As shown schematically in FIG. 5A, door 220 of console 200 is shown in the fourth state or intermediate position and being pushed upward by a finger. The intermediate position shown in FIG. 5A is generally identical to the position described above in connection with FIG. 4E. As shown schematically in FIG. 5A, console 200 may be moved from the intermediate position by pushing the free end of door 220 in a direction towards base 210 as shown in FIG. 5A.

Figure 5B:
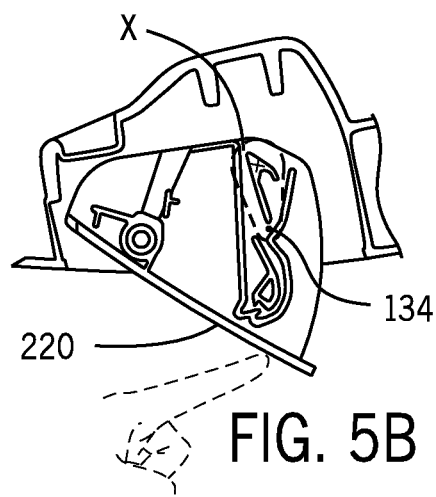

As shown schematically in FIG. 5B, door 220 is shown in a first transitional position as it rotates upward from the intermediate position shown in FIG. 5A. As shown schematically in FIG. 5B, door 220 is being pushed by hand from the intermediate mirror position show in FIG. 5A. According to an exemplary embodiment as shown in FIG. 5B, when pushed as shown, door 220 may rotate upward into the interior compartment of the base. In the position shown schematically in FIG. 5B, the conversation mirror on the exterior surface the rear panel of door 220 may be at least partially obscured by the base.

According to the exemplary embodiment shown in FIG. 5B, the track on door 220 has moved upward relative guide pin 134, with guide pin 134 shown in a position adjacent the bottom end of a downward extending projection or tab of the upper interior formation on the track. The location of guide pin 134 shown in FIG. 5B may be derived from guide pin 134 channeling track by contacting the side edge of the downward projection or tab of the upper interior formation as the track moves upward around guide pin 134 and as door 220 is rotated upward under the influence of external force.

As shown schematically in FIGS. 5B through 5E, exit path X is shown according to an exemplary embodiment. As shown schematically across FIG. 5B through 5E, exit path X according to an exemplary embodiment may comprise a portion of the track on door 220. Exit path X may provide a generally clear route for the track to descend around guide pin 134 until it disengages from guide pin 134 through the open top end of the track system. In other words, according to an exemplary embodiment as shown in FIGS. 5C through 5F, exit path X may not contain any features for engaging or restraining guide pin 134. Thus, absent external upward force being exerted on door 220, rotation of door 220 into a position where guide pin 134 passes into exit path X, may cause door 220 to freely rotate downward from the base under either the influence of gravity and/or force exerted by a spring urging door 220 downward. According to the exemplary embodiment shown in FIG. 5B, the location of guide pin 134 at the bottom end of the upper interior formation of the track is shown to be adjacent exit path X.

Figure 5C:
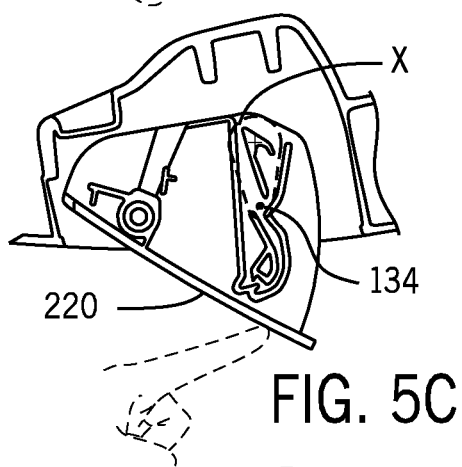

As shown schematically in FIG. 5C, door 220 is shown in a second transitional position rotating upward from the intermediate position shown in FIG. 5A. As shown schematically in FIG. 5C, door 220 has been rotated slightly upward from the position shown in FIG. 5B. According to the exemplary embodiment shown in FIG. 5C, external force applied by a finger may continue to rotate door 220 upward into the interior compartment of the base. As shown schematically in FIG. 5C, upward rotational movement of door 220 (and corresponding upward movement of the track) relative guide pin 134 may position guide pin 134 within a gap between the raised interior formations in the track. The gap may provide a switch or escape path for access to exit path X without requiring door 220 to rotate into the closed position.

Figure 5D:
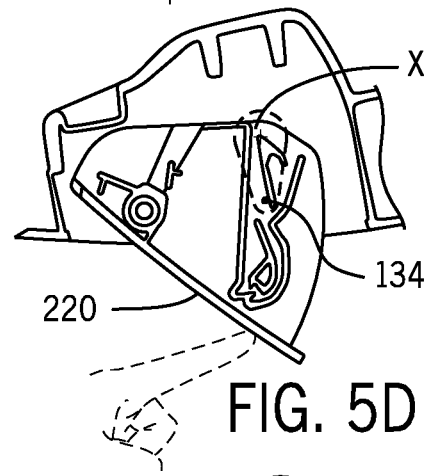

As shown schematically in FIG. 5D, door 220 is shown in a position where it has rotated slightly downward from the position shown in FIG. 5C. Such downward rotational movement may result from external force from the finger starting to be withdrawn. Thus, although FIG. 5D illustrates finger still in contact with door 220, it will be understood that an exemplary embodiment as shown in FIG. 5D is schematically representative of a point where finger is just starting to be withdraw or pulled back, such as, for example, where it is about to let go of door 220.

As shown schematically in FIG. 5D, downward rotation of door 220 according to the exemplary embodiment may result in the track on door 220 moving downward around guide pin 134 into or toward exit path X which may extend through the open top end of the track system on door 220. Thus, as shown schematically in FIG. 5D, the track has moved downward from the position shown in FIG. 5C with guide pin 134 being shown in a position along a forward side of the downward projection or tab of the upper interior formation in the track.

Figure 5E:
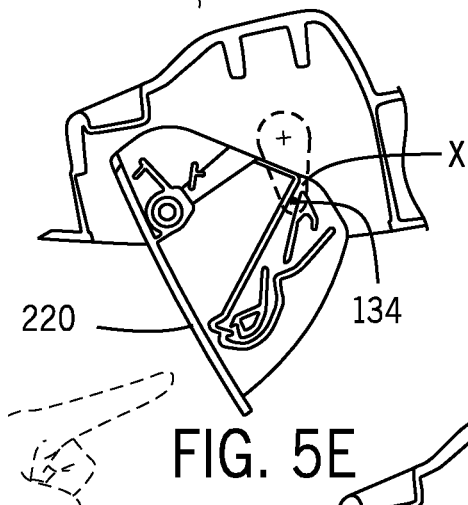

As shown schematically in FIG. 5E, door 220 is shown in a transitional position where finger has released the face panel of door 220 and is no longer exerting upward force upon door 220. According to an exemplary embodiment as shown in FIG. 5E, door 220 has rotated downward from the position shown in FIG. 5D. Such downward rotation may be brought about by gravity or a spring force urging door 220 downward. As shown schematically in FIG. 5E, guide pin 134 according to an exemplary embodiment may be disposed within exit path X along the forward side of the upper interior formation of the track and may be moving upward toward the open top end of the track.

Figure 5F:
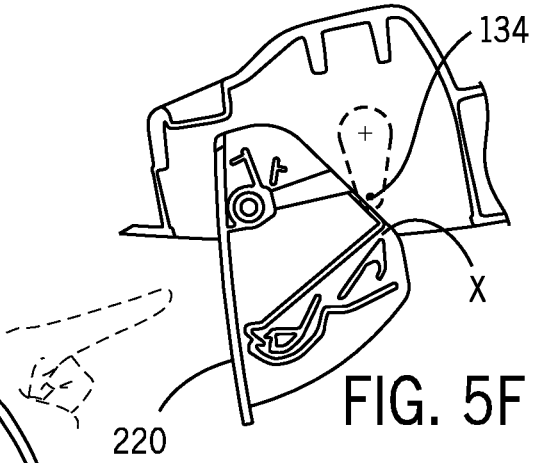

As shown schematically in FIG. 5F, door 220 is shown in a transitional position where door 220 has rotated downward from the position shown in FIG. 5E with guide pin 134 emerging from exit path X at the opening in the top of the track system. As shown schematically in FIG. 5E, the track according to an exemplary embodiment may have a flange at its upper end extending along the top edge of the side panel of door 220. According to the exemplary embodiment illustrated in FIG. 5F, the flange may engage and slide along guide pin 134 as door 220 rotates downward.

Figure 5G:
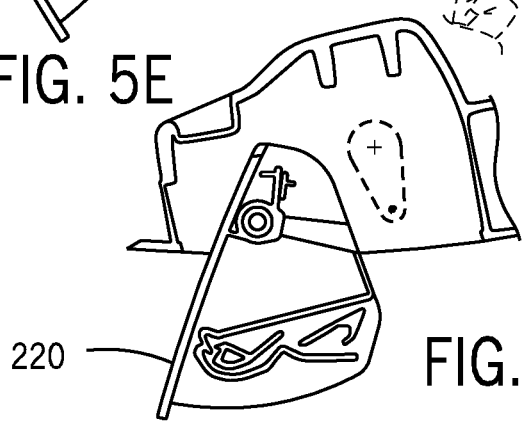

As shown schematically in FIG. 5G, door 220 of the console is shown in the fully open and extended position according to an exemplary embodiment as more fully described above in connection with FIG. 4C. As shown schematically in FIG. 5G, the free end of door 220 may extend downward from the base from the pivot point and door 220 may be detached from the hinge.

As shown schematically in FIGS. 6A through 6K, compartment or door 220 of console 200 is shown in a sequence of different positions according to an exemplary embodiment, including positions after an oversized pair of sunglasses S have been placed within the interior storage volume of door 220 (See FIGS. 6C through 6J). As shown schematically in FIGS. 6A through 6E, door 220 is shown rotating from a first state or closed position shown in FIG. 6A through a transitional second state shown in FIG. 6B to a third state or open position shown in FIG. 6C. A shown schematically, door 220 is further shown rotating from the open position shown in FIG. 6C to a fourth state or intermediate mirror position shown in FIG. 6E, and from the intermediate position shown in FIG. 6E to the open position shown in FIG. 6K. As shown schematically in FIGS. 6A through 6K, a mechanism may be provided to guide movement of the compartment or door 220 relative the base 210. The mechanism may include track 128 on door 220 and hinge 126 with guide pin 134 for traveling within the track 128.

As shown schematically in FIGS. 6C through 6J, sunglasses S placed in the interior storage volume of door 220 extend partially out from the interior storage volume of door 220. As described above, with traditional overhead storage compartments, once the door is moved into the intermediate mirror position, the door is required to first be moved into the closed position before it may extend to the fully open position. It has generally been found that placement of an oversized article, such as the sunglasses S shown schematically in FIGS. 6C through 6J, into a storage bin of traditional overhead storage compartments may interfere with rotation of the door relative the base and prevent the door from closing.

According to the exemplary embodiment shown in the sequence of FIGS. 6C through 6I, door 220 may be permitted to rotate from the intermediate mirror position to the open position without having to be rotated into the closed position. Such operation and range of motion reduces the likelihood of larger-sized articles such as sunglasses S from interfering with rotation of door 220 or preventing the door from closing.

As shown schematically in FIG. 6A, console 200 is shown in a closed position according to an exemplary embodiment as more fully described above in connection with FIG. 4A. When console 200 is in the closed position as shown schematically in FIG. 6A, door 220 may be retained and secured within the interior compartment of base 210 and the interior storage volume on door 220 may be inaccessible for receiving items for storage.

According to the exemplary embodiment shown in FIG. 6A, guide pin 134 of hinge 126 may be seated within a bottom portion of the track of door 220 against a downward-extending catch formed along the bottom edge of a raised interior formation. Engagement of the guide pin 134 in this position may retain door 220 in the closed position within base 210 and prevent door 220 from opening downward.

As shown schematically in FIG. 6B, door 220 of the console is being manually pushed upward by hand H which may actuate opening of the console according to an exemplary embodiment. The exemplary embodiment shown schematically in FIG. 6B is described above in connection with FIG. 4B.

As shown schematically in FIG. 6C, door 220 of the console is shown in a fully extended and open position according to an exemplary embodiment which is described above in connection with FIGS. 4C and 5G. As shown schematically in FIG. 6C, when the console is in the fully open position, door 220 may extend downward from the base and track 128 on the exterior side of door 220 may be disengaged fully from the hinge 126 which is rotationally secured in the base at pivot point and guide pin 134 may be positioned outside of track 128. When door 220 is in the open position as show schematically in FIG. 6C, an interior storage volume within the interior of door 220 may be accessible to receive and hold items such as a folded pair of sunglasses S. As shown schematically in FIG. 6C (and following FIGS. 6D through 6J), sunglass S are oversized and extend outwardly from the interior storage volume of door 220.

According to an exemplary embodiment shown schematically in FIG. 6C, track 128 on the exterior side of door 220 may have a slotted or recessed channel defined by a perimeter edge and edges of interior protrusions such as formations 228a, 228b. As shown schematically, in FIG. 6C, interior formations 228a, 228b of track 128 may be spaced apart and separated by gap G.

As shown schematically in FIG. 6D, door 220 of the console is shown in the open position with folded sunglasses S stored within an interior storage volume of door 220 according to an exemplary embodiment. As shown schematically in FIG. 6D, hand H is shown pushing the bottom face panel of door 220. According to an exemplary embodiment as show in FIG. 6D, hand H may exert force on door 220 and may rotate door from the open position towards the intermediate position shown in FIG. 6E. As described above in connection with FIG. 4D, external force exerted on door 220, such as by hand H, may overcome resistance from a spring and/or damper urging door 220 downward toward the open position. According to an exemplary embodiment shown schematically in FIG. 6D, guide pin 134 inwardly extending from the hinge on the base may be detached and disengaged from the track on the exterior side of door 220 when door 220 begins to move upward from the open position.

As shown schematically in FIG. 6E, door 220 of the console is shown in the intermediate position with folded sunglasses S stored within an interior storage volume of door 220 according to an exemplary embodiment (see also FIGS. 4E and 5A). As shown schematically in FIG. 6E, when door 220 of the console is in the intermediate position, a protrusion such as raised interior formation 228a of the track may be engaged on guide pin 134. According to the an exemplary embodiment as show in in FIG. 6E, such engagement may retain door 220 in the intermediate position and prevent door 220 from rotating downward from the base under the force of gravity and/or spring force urging door 220 downward toward the open position.

As shown schematically in FIG. 6F, door 220 of the console is shown in a transitional position rotating upward from the intermediate position shown in FIG. 6E. As shown schematically in FIG. 6F, folded sunglasses S may be stored within an interior storage volume of door 220. As shown schematically in FIG. 6F, door 220 may be forced to rotate upward by a hand. According to the exemplary embodiment shown in FIG. 6F, when door 220 is pushed as shown, it may rotate upward into the interior compartment of the base. As such rotation occurs, the conversation mirror on the exterior surface the door 220 may be at least partially obscured by the base.

As shown schematically in FIG. 6G, door 220 of the console is shown in a transitional position rotating upward from the intermediate position shown in FIG. 6E. As shown schematically in FIG. 6G, sunglasses S may be stored within an interior storage volume of door 220. As shown schematically in FIG. 6G, door 220 has been rotated slightly upward from the position shown in preceding FIG. 6F, with a finger pushing the face panel of door 220 in a direction towards the base. In the position show in FIG. 6G, external force on door 220 may rotate door 220 upward; the external force may overcome an opposing force from a spring and/or damper urging door 220 toward the open position.

As shown schematically in FIG. 6G, upward rotation of door 220 (and corresponding upward movement of track 128) relative guide pin 134 may move the track around guide pin 134, with the downward projection or tab of the upper interior formation moving upward above guide pin 134 such that guide pin 134 becomes positioned within the gap between raised interior formations or protrusions of the track. As described above, exit path X may comprise a portion of the track extending from the open top end of track.

As shown schematically in FIG. 6H, door 220 in a transitional position where external force applied by a finger has rotated door 220 into a position where guide pin 134 is positioned within a gap between the raised interior features of the track. As shown schematically in FIG. 6H, oversized sunglasses S are stored within an interior storage volume of door 220. As shown schematically in FIG. 6H, the gap between the raised interior features of the track may act as a switch leading to the exit path X extending upward to the open top end of the track. According to an embodiment as shown in FIG. 6H, the position of door 220 and guide pin 134 is representative of a point where the finger has started to be withdrawn from door 220, such as, for example, where it about to let go and disengage from door 220.

As shown schematically in FIG. 6I, door 220 is shown in a transitional position rotating downward toward the open positon of FIG. 6K. As shown schematically in FIG. 6I, oversized sunglasses S are stored within an interior storage volume of door 220. According to the exemplary embodiment shown in FIG. 6I, the finger has been withdrawn from the bottom panel of door 220 and door 220 has rotated downward from the position shown in FIG. 6H.

According to an exemplary embodiment as show in in FIG. 6I, guide pin 134 is shown as being located within the exit path X of the track and approaching the open top end of the track. Thus, according to an exemplary embodiment as show in in FIG. 6I, withdrawal of external force from finger has resulted in door 220 rotating downward, with the track on door 220 also moving downward around guide pin 134. As shown schematically in FIG. 6I, the track on door 220 has descended such that guide pin 134 is show in a position within the exit path X near the top of the upper interior formation and close to the opening of the track system.

As shown schematically in FIG. 6J, door 220 of the console is shown in a transitional position between as the door moves into the open positon shown in FIG. 6K. As shown schematically in FIG. 6J, oversized sunglasses S are stored within an interior storage volume of door 220. As shown schematically in FIG. 6J, door 220 has rotated downward from the position shown in FIG. 6I with guide pin 134 exiting the open top of track at exit path X. As shown schematically in FIG. 6J, the track of door 220 may have a flange extending along the top edge of the side panel of door 220 which may engage guide pin 134 and slide along guide pin as door 220 rotates downward.

As shown schematically in FIG. 6K, door 220 of the console is shown in the fully open and extended position according to an exemplary embodiment as more fully described above in connection with FIGS. 4C and 5G. As shown schematically in FIG. 6K, the free end of door 220 may extend downward from the base of the storage compartment from the pivot point and door 220 may be fully disengaged and separated from the hinge and the guide pin extending from the hinge.

As shown schematically in FIG. 7C, a side view of a compartment or door 220 or compartment of a console is shown having a path P2 of travel that the guide pin may take through the track on door 220 according to an exemplary embodiment. As shown schematically in FIG. 7A, a corresponding detail view is shown of the track 228 of FIG. 7C. According to the exemplary embodiment shown in FIGS. 7C and 7A, the track system on the side panel of door 220 may be configured to guide movement of the door 220 or compartment relative the base of console.

As shown schematically in FIGS. 7C and 7A, track 228 according to an exemplary embodiment may comprise a slotted or recessed channel 250 defined by the interior edge of a perimeter member 230 and the outer edges of a protrusion such as raised formations 228*a*, 228*b* within the interior of the track (inside the perimeter member 230). According to the exemplary embodiment shown in FIGS. 7C and 7A, perimeter member 230 may have an integral design featuring an open top end having an opening between two generally downwardly depending side arms that are joined together at a bottom end. The open top end may additionally have a flange extending outwardly from one side arm opposite the opening. As shown schematically in FIGS. 7C and 7A, the bottom end of the perimeter member may have a jagged configuration (generally resembling a W-shape) featuring an upward extending ridge positioned between recessed troughs on opposing sides of the ridge.

As shown schematically in FIGS. 7C and 7A, track 228 according to an exemplary embodiment may include a protrusion such as upper and lower raised interior formations 228*a*, 228*b*. According to the exemplary embodiment shown in FIGS. 7C and 7A, the upper interior formation 228*a* may have a top portion and an elongated projection or tab extending at a downward angle from the top portion. As shown schematically in FIGS. 7C and 7A, the top portion of the upper interior formation 228*a* may include an angled top edge and an arm.

As shown schematically in FIGS. 7C and 7A, according to an exemplary embodiment, the upper interior formation 228*a* of track 228 may include an inverted hook J defined below the top portion and between the arm and the downward projection or tab. Hook J may be configured to engage and be supported by the guide pin, retaining the door of the console in the intermediate position and may prevent the track (and door) from rotating downward. The lower interior formation 228*b* of track 228 may include a downwardly extending arm integral with an enlarged irregular-shaped loop having an angled bottom edge and a downward-extending projection or tab, which together may form a recess R. As shown schematically in FIGS. 7C and 7A, the angled bottom edge of the lower interior formation 228b may be positioned above the upward extending ridge of the perimeter member 230.

As shown schematically in FIGS. 7C and 7A, the raised upper and lower interior formations 228a, 228b according to the exemplary embodiment may be separated from one another with the slotted channel 250 extending between the formations 228a, 228b through gap G. According to the exemplary embodiment shown in FIGS. 7C and 7A, gap G may extend around the downward projection or tab of the upper interior formation 228a and may act as a switch leading to escape path E on the return side of the track 228a—with escape path E leading to exit path X toward the open top end of the track 228. As shown schematically in FIGS. 7C and 7A, gap G provides a switch between a first path extending around the lower interior formation and a second path extending through the formations to the exit path X.

According to an exemplary embodiment as shown in FIGS. 7C and 7A, rotation and movement of the door of the console may move the track 228 relative the guide pin, with the guide pin being directed into different locations along the travel path P2. For example, as the door of console is rotated upward from the intermediate position, track 228 may disengage from the guide pin at hook J and move upward relative the guide pin with the guide pin being directed into the midsection M of the track.

According to an exemplary embodiment as shown in FIGS. 7C and 7A, upon direction of the guide pin into the midsection M of the track, alternate forward paths for the guide pin may be provided. In particular, upward force on the door of the console may direct the guide pin into minimal travel position 234d. When the guide pin is directed into such position and upward force on the door is withdrawn (such as where the door is rotated upward from the intermediate position and released as shown in FIGS. 5A through 5E), track 228 may move downward around the guide pin, with guide pin being directed along a first path through escape path E via gap G and out of track through exit path X. Such travel of the track 228 around the guide pin may enable the door of the console to rotate downward to the open position.

According to an exemplary embodiment as shown in FIGS. 7C and 7A, track 228 may provide a second path of travel where the guide pin is directed into minimal travel position 234d and upward force on the door is maintained. In particular, where such conditions occur, the track 228 may continue to move upward relative the guide pin with the slotted channel 250 of track 228 moving around the guide pin such that guide pin may be directed along a second path from minimal travel position 234d to recess R along the bottom edge of the lower interior formation 228b. When recess R is engaged and supported on the guide pin, the door of the console may be retained in the closed position and such engagement may prevent the door from rotating downward on its own.

According to an exemplary embodiment as shown in FIGS. 7C and 7A, when the door of the console is retained in the closed position, upward force on the door (see e.g. FIGS. 4B and 6B) may rotate the door upward in the base and track 228 may shift upward and disengage the guide pin at recess R. Such movement may direct the guide pin into the opposing recess at the bottom of the perimeter member 230 along the bottom section B of the track 228. Such engagement may restrict further upward rotation of the door within the base.

According to an embodiment as shown in FIGS. 7C and 7A, from the bottom section B, the slotted channel 250 of track 228 may provide an exit path X that may extend upward without features that may restrain the track 228 on the guide pin. Thus, when the guide pin is seated in the recess along the bottom section B of the track 228 and upward force on the door is withdrawn, the track 228 may be released and move downward around the guide pin, with the guide pin being directed from the bottom section B through exit path X. According to an embodiment as shown in FIGS. 7C and 7A, such movement may enable the door to freely rotate downward under the force of gravity or force generated by a spring and/or damper which may urge the door downward toward the open position. As shown schematically in FIG. 7B, a sequence of positions of compartment or door 220 relative guide pin 234 according to an exemplary embodiment is shown. According to the embodiment shown in FIG. 7B, when door 220 is in the opened position 234a, it may be fully disengaged from the guide pin. With upward rotation of door 220 from the opened position 234a to the intermediate mirror position 234b, the guide track of door 220 may engage the guide pin. When door 220 has been rotated into the transitional position 234c and upward force on the door is withdrawn, the door 220 may rotate downward to the intermediate mirror position 234b with track moving downward to engage the guide pin at 234b.

As shown schematically in FIG. 7B, as door 220 rotates upward from the intermediate mirror position 234b, the track of door 220 may shift upward and disengage from the guide pin at intermediate mirror position 234b. Door 220 may proceed to rotate upward through transitional position 234c and may reach minimal travel position 234d. When minimal travel position 234d is reached and upward force on door 220 is withdrawn, guide pin may be directed along a first path through the track and door 220 may be permitted to freely rotate downward through escape transition position 234h to the opened position 234a. Alternatively, where door 220 reaches minimal travel position 234d and upward force is maintained, the guide pin may be directed along a second path through the track and door 220 may continue to rotate upward until it reaches over-travel position 234e where the guide pin may be seated in a trough along the perimeter member of the guide track. Such engagement may restrain door 220 from rotating further upward. With release of upward force on door 220 at the over-travel position 234e, door 220 may rotate downward and settle into the closed position 234f with the guide pin engaged in the recess along the bottom edge of the lower raised interior formation at 234f. Such engagement may prevent the door 220 from rotating downward on its own.

As shown schematically in FIG. 7B, when door 220 is in the closed position 234f, upward force on door 220 (see e.g. FIGS. 4B and 6B) may rotate door 220 upward and into a second over-travel position 234g where the guide pin is seated within the opposing recess at the bottom of the track's perimeter member. Such engagement may again restrict further upward rotation of the door 220 within the base. When door 220 is in the second over-travel position 234g and upward force is withdrawn, door 220 may be permitted to freely rotate downward under the force of gravity or force generated by a spring and/or damper which may force door 220 downward back toward the opened position 234a.

As shown schematically in FIG. 10A, a side view of a compartment or door 320 or compartment of a console is shown having a path P3 of travel that guide pin may take through the track 328 on door 320 according to an exemplary embodiment. As shown schematically in FIG. 10B, a corresponding detail view is shown of the track 328 of FIG. 10A. According to the exemplary embodiment shown in FIGS. 10A and 10B, the track system on the side panel of door 320 may be configured to guide movement of the door 320 or compartment relative the base of console.

As shown schematically in FIGS. 10A and 10B, track 328 according to the exemplary embodiment may comprise a slotted or recessed channel 328 as defined by the interior edge of a perimeter member 330 and the outer edges of a protrusion such as raised interior formations 328a, 328b within the interior of the track (inside the perimeter member 330). Although the shape of the perimeter member X show in FIGS. 10A and 10B is different from what has been previously described, the general features of perimeter member 330 are substantially similar to the exemplary embodiment shown in FIGS. 7C and 7A.

As shown schematically in FIGS. 10A and 10B, track 328 according to an exemplary embodiment may include a protrusion such as raised interior formations, including a larger formation 328a extending downward through the track 328 and a smaller islet-like formation 328b alongside the larger formation 328a. According to the exemplary embodiment shown in FIGS. 10A and 10B, the larger interior formation 328a may have an integral design featuring opposing upper and lower portions and an elongated midsection. The upper portion of the larger interior formation 328a may include an angled top edge and an arm extending from the top edge. The elongated midsection of the larger interior formation may depend downward from the upper portion and bend as it extends downward along the interior of the track 328.

As shown schematically in FIGS. 10A and 10B, according to an exemplary embodiment, the larger interior formation 328a of track 128 may include an inverted hook J defined below the top portion and between the arm and the midsection. Hook J may be configured to engage and be supported by the guide pin when the door of the console is in the intermediate mirror position and may retain the track 328 (and door) from rotating downward. The lower portion of the larger interior formation 328a may be integral with the midsection and may include an enlarged irregular-shaped portion having an angled bottom edge and a downward-extending projection or tab, which together may form a recess R. As shown schematically in FIGS. 10A and 10B, the angled bottom edge of the larger internal formation 328a may be positioned above the upward extending ridge of the perimeter member 330.

As shown schematically in FIGS. 10A and 10B, the smaller interior formation 328b may be positioned below and offset from hook H. The smaller formation 328b may be generally triangular in shape featuring three sides joined together at three corners.

As shown schematically in FIGS. 10A and 10B, the larger and smaller interior formations 328a, 328b or protrusions according to the exemplary embodiment may be detached from one another with the slotted channel 350 extending between the formations 328a, 328b and entirely around the smaller formation 328b. According to the exemplary embodiment shown in FIGS. 10A and 10B, the portion of the slotted channel 350 adjacent the smaller interior formation 328b (opposite the larger formation 328a) may provide an escape path E which may continue upward through exit path X.

According to the exemplary embodiment of FIGS. 10A and 10B, rotation and movement of the door of the console may move track 328 relative the guide pin, with the guide pin being directed into different locations along the travel path P3. For example, as the door is rotated upward from the intermediate mirror position, track 328 may move upward relative the guide pin and disengage from the guide pin at hook H. Where upward force on the door is maintained, the guide pin may be directed into the midsection M of track 328.

According to the exemplary embodiment shown in FIGS. 10A and 10B, upon direction of the guide pin into the midsection M of track 328, alternate forward paths may be provided including a first path and a second path. In particular, upward force on the door may direct the guide pin into minimal travel position 334d. When such position is achieved and upward force is withdrawn (such as where the door is rotated upward from the intermediate mirror position and released as shown in FIGS. 5A through 5E), track 328 may move downward around the guide pin, with guide pin being directed along a first path through escape path E and out of track through exit path X. Such travel of the track 328 around the guide pin may enable the door of the console to rotate downward to the open position. Thus, as shown schematically in FIGS. 10A and 10B, exit path X may be generally include a same portion of the track 328 where guide pin enters the track 328.

According to an exemplary embodiment as shown in FIGS. 10A and 10B, track 328 may provide an alternate second path of travel where the guide pin is directed into minimal travel position 334d and upward force on the door is maintained. In particular, where such conditions occur, track 328 may continue to move upward relative the guide pin with the slotted channel 350 of track 328 moving around the guide pin such that guide pin may be directed in a second path from minimal travel position 334d to recess R along the bottom edge of the lower interior formation 328b. When recess R is engaged and supported on the guide pin, the door of console may be retained in the closed position and such engagement may prevent the door from rotating downward on its own.

According to an exemplary embodiment as shown in FIGS. 10A and 10B, when the door of the console is in the closed position, upward force on the door (as generally shown in FIGS. 4B and 6B) may rotate the door upward in the base and track 328 may shift upward and disengage the guide pin at recess R. Such movement may direct the guide pin into the opposing recess at the bottom of the perimeter member 330 along the bottom section B of the track 328. Such engagement may restrict further upward rotation of the door within the base.

According to an embodiment as shown in FIGS. 10A and 10B, from the bottom section B, the slotted channel 350 of track 328 may form a second exit path X2 that may extend upward without features that may restrain the track on the guide pin. Thus, when guide member is seated in the recess along the bottom section B of the slotted channel 350 and upward force on the door is withdrawn, such movement may enable the door to freely rotate downward under the force of gravity or force generated by a spring and/or damper which may urge the door downward toward the open position.

As shown schematically in FIG. 10C, a sequence of positions of compartment or door 320 relative guide pin 334 according to an exemplary embodiment is shown. According to the embodiment shown in FIG. 10C, when door 320 is in the opened position 334a, it may be fully disengaged from the guide pin. With upward rotation of door 320 from the opened position 334a to the intermediate mirror position 334b, the track of door 320 may engage the guide pin. When door 320 has been rotated into transitional position 334c and upward force on the door 320 is withdrawn, the door 320 may descend until it settles in intermediate position at 334*b*.

As shown schematically in FIG. 10C, as door 320 rotates upward from the intermediate position 334*b*, the track may shift upward and disengage from the guide pin at intermediate position 334*b* and move upward relative the guide pin. As door 320 proceeds to rotate upward it may proceed through transitional position 334*c* and may reach minimal travel position 334*d*. Where minimal travel position 334*d* is reached and upward force on door 320 is withdrawn, the guide pin may be directed along a first path in the track and door 320 may be permitted to freely rotate downward back to the opened position 334*a*. Alternatively, where door 320 reaches minimal travel position 334*d* and upward force is maintained, the guide pin may be directed along a second path in the track and door 320 may continue to rotate upward until it reaches over-travel position 334*e* with the guide pin may seated in a trough along the perimeter member of the guide track. Such engagement may restrain door 320 from rotating further upward. With release of upward force on door 320 at the over-travel position 334*e*, door 320 may rotate downward and settle into the closed position 334*f* with the guide pin engaged in the recess along the bottom edge of the raised interior formation at 334*f*. Such engagement may retain the door 320 from rotating downward on its own.

As shown schematically in FIG. 10C, when door 320 is in the closed position 334*f*, upward force on door 320 (see e.g. FIGS. 4B and 6B) may rotate door 320 upward into a second over-travel position 334*g* where the guide pin is seated within the opposing recess at the bottom of the track's perimeter member. Such engagement may restrict further upward rotation of the door 320 within the base. Where door 320 is in the second over-travel position 334*g* and upward force is withdrawn, door 320 may be permitted to freely rotate downward under the force of gravity or force generated by a spring and/or damper which may push door 320 downward back toward the opened position 334*a*.

As shown schematically in FIGS. 11A through 11D, console doors having additional track configurations having additional interior features and travel paths according to exemplary embodiments. As shown schematically in FIGS. 11A-11D, the tracks according to the exemplary embodiments may comprise a slotted or recessed channel with interior members and a perimeter having characteristics as described previously.

Figure 11A:
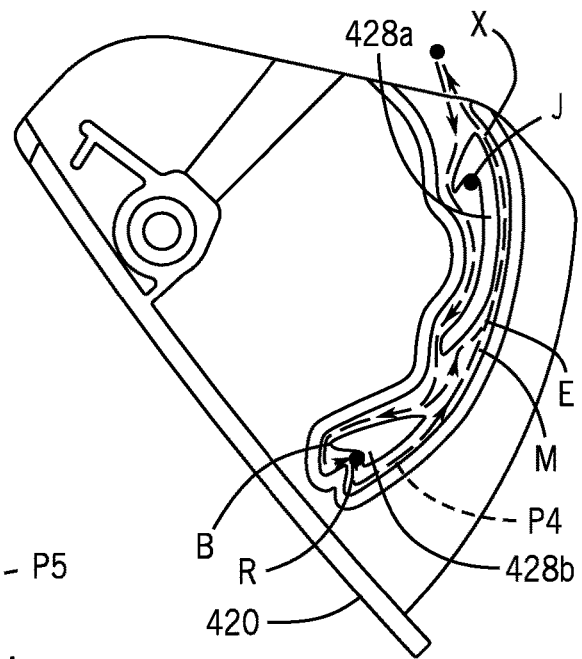
FIG. 11A is a schematic elevation view of an overhead storage compartment door with a path of a mechanism according to an exemplary embodiment.

As shown schematically in FIG. 11A, a side view of a console compartment or door 420 is shown having a path P4 of travel that guide pin may take through the track on door 420 according to an exemplary embodiment. The track according to an exemplary embodiment as shown schematically in FIG. 11A may include separate and detached protrusions such as upper and lower raised interior formations 428*a*, 428*b*. As shown schematically in FIG. 11A, the upper interior formation 428*a* may comprise a top portion and an elongated curved projection or tab bending downward from the top portion. As shown schematically in FIG. 11A, upper interior formation 428*a* may include a top pop extending outwardly past the downwardly curved projection and an inverted hook J may be defined between the bottom of the top portion and the side of the downwardly curved projection or tab. Hook J may be configured to engage and be supported by the guide pin when door 420 of the storage compartment is in the intermediate mirror position and may prevent the track (and door) from rotating downward. The lower interior formation 428*b* may be spaced at a distance from the upper formation and include an angled bottom edge and a downward-extending projection or tab, which together may form a recess R. As shown schematically in FIG. 11A, the bottom edge of the lower interior formation 428*b* may be positioned above the upward extending ridge of the track's perimeter member.

As shown schematically in FIG. 11A, the raised upper and lower interior formations 428*a*, 428*b* or protrusions according to the exemplary embodiment are separated from one another with the slotted channel of the track extending between the formations through a gap around the midsection M of the track. According to the exemplary embodiment shown in FIG. 11A, the gap may extend around the downward projection or tab of the upper interior formation 428*a* and act as a switch leading to an escape path E on a return side of the track—with escape path E leading to exit path X.

According to the exemplary embodiment of FIG. 11A, rotation of door 420 may move the track relative the guide pin, with the guide pin being positioned in different locations along the travel path P4. For example, as door 420 is rotated upward from the intermediate mirror position, the track may shift upward and disengage from the guide pin at hook H. Where the track continues to move upward relative guide pin, the guide pin may be directed towards the midsection M of the track.

According to the exemplary embodiment shown in FIG. 11A, upon direction of the guide pin into the midsection M of the track, multiple paths for the guide pin are possible, including a first path and a second path. For example, where upward force on door 420 is withdrawn (see e.g. FIGS. 5A through 5E), the track may move downward descend around the guide pin, with guide pin being directed along a first path through the gap at the midsection M of the track and into escape path E. From escape path E, door 420 may continue to rotate downward with guide pin being directed out of track through exit path X. Such movement of the track around the guide pin may result in door 420 rotating downward to the open position.

According to the exemplary embodiment shown in FIG. 11A, where guide pin reaches midsection M of the track and upward force on door 420 is maintained, the guide track may continue to move upward relative the guide pin, with the guide pin being directed along a second path into recess R at the bottom section of the track B. When recess R is engaged and supported on the guide pin, door 420 may be retained in the closed position and such engagement may prevent the door 420 from rotating downward on its own.

According to an exemplary embodiment shown in FIG. 11A, when door 420 is in the closed position, exertion of upward force on the door (see e.g. FIGS. 4B and 6B) may rotate door 420 upward in the console base and the track may shift upward and disengage the guide pin at recess R. According to the exemplary embodiment shown in FIG. 11A, such rotation of door 420 may move the track upward with guide pin being directed into the opposing recess at the bottom of the track perimeter member. Such engagement may restrict further upward rotation of the door 420 within the base. As shown schematically in FIG. 11A, escape path E may be without features that would restrain the track on the guide pin. Thus, when guide member is seated in the recess along the bottom section of the track and upward force is withdrawn, the track may move downward, permitting the guide pin to be directed from the bottom section through escape path and up to exit path X at the open end of the track system. Such movement may enable door 420 to freely rotate downward under the force of gravity or force generated by a spring and/or damper which may force door 420 toward the open position.

Figure 11B:
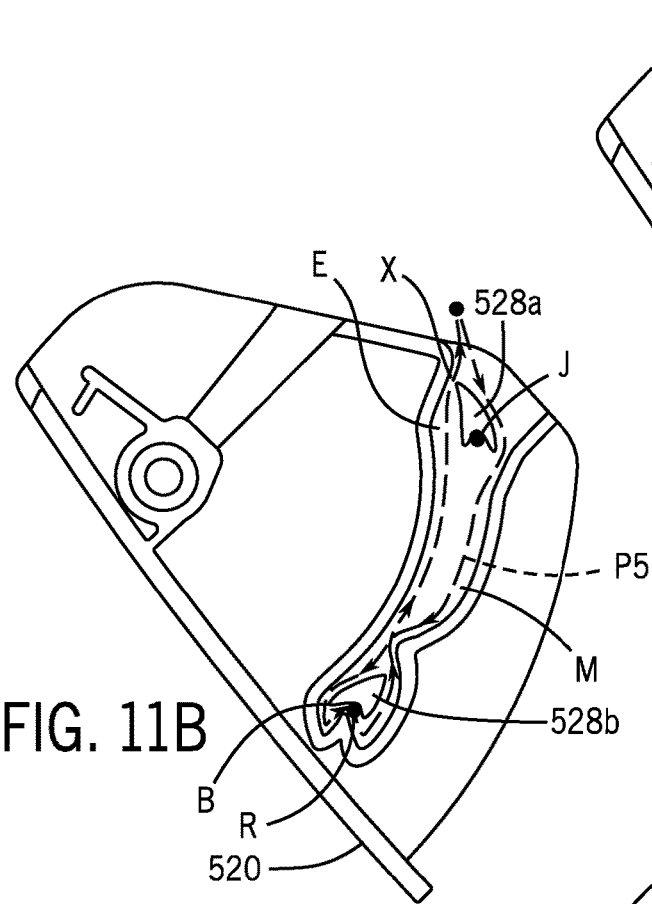
FIG. 11B is a schematic elevation view of an overhead storage compartment door with a path of a mechanism according to an exemplary embodiment.
Figure 11C:
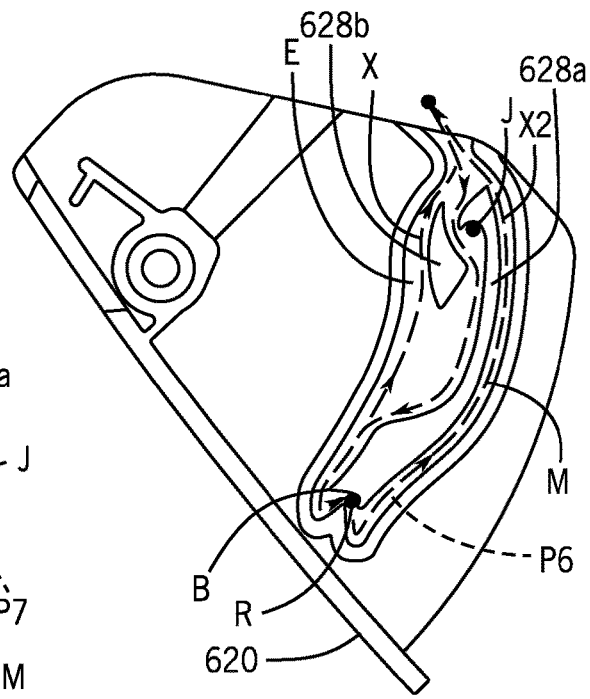
FIG. 11C is a schematic elevation view of an overhead storage compartment door with a path of a mechanism according to an exemplary embodiment.
Figure 11D:
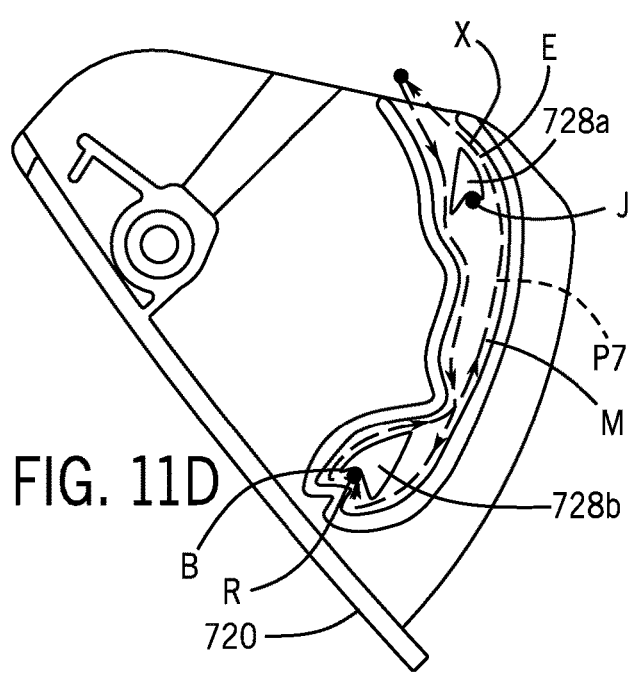
FIG. 11D is a schematic elevation view of an overhead storage compartment door with a path of a mechanism according to an exemplary embodiment.

As shown schematically in each of FIGS. 11B and 11D, a side view of storage compartment door 520, 720 are shown as having a path P5, P7 of travel that a guide pin may take through the track of door 520, 720 according to exemplary embodiments. As shown schematically in FIGS. 11B and 11D, the track according to the exemplary embodiments may include separate and detached protrusions such as upper 528a, 728a and lower 528b, 728b raised interior formations.

According to the exemplary embodiment shown in FIGS. 11B and 11D, the upper interior formation 528a, 728a may have a fin-shaped configuration having a bottom edge forming an inverted hook H. Hook J may be configured to engage and be supported by the guide pin when the door 520, 720 of the console is in the intermediate mirror position and may prevent the track (and door 520, 720) from rotating downward. As shown schematically in FIGS. 11B and 11D, lower interior formation 528b, 728b may be spaced apart from the upper formation 528a, 728a and include a bottom edge forming a recess R. As shown schematically in FIGS. 11B and 11D, recess at the lower interior formation 528b, 728b may be positioned above the upward extending ridge of the track's perimeter member.

As shown schematically in FIGS. 11B and 11D, the raised upper 528a, 728a, and lower 528b, 728b interior formations according to the exemplary embodiments are separated from one another and are generally at opposing ends of the track. As shown schematically in FIGS. 11B and 11D, a large gap may exist at the midsection M of the track between the interior formations or protrusions. According to the exemplary embodiments shown in FIGS. 11B and 11D, the gap may act as a switch which may direct the guide pin to an escape path E on a return side of the track adjacent the upper interior formation 528a, 728a—with escape path E leading to exit path X at the open end of the track system.

According to the exemplary embodiments of FIGS. 11B and 11B, rotation and movement of door 520, 720 may move the track relative the guide pin, with the guide pin being directed into different locations along the travel path P5, P7. For example, as door 520, 720 is pushed or urged to rotate upward from the intermediate position, the track may shift upward, disengage from the guide pin at hook J and continue to move upward relative guide pin with the guide pin being directed towards the midsection M of the track.

According to the exemplary embodiments shown in FIGS. 11B and 11D, upon direction of the guide pin past the upper interior formation 528a, 728a multiple travel paths for the guide pin may be provided. For example, where upward force on door 520, 720 is withdrawn (see e.g. FIGS. 5A through 5E), the track may be permitted to descend around the guide pin, with guide pin being directed upward along a first path through escape path E. From escape path E, door 520, 720 may continue to rotate downward with guide pin being directed out of track through exit path X. Such travel of the guide track around the guide pin may enable door of the storage bin to rotate downward to the open position.

According to the exemplary embodiments shown in FIGS. 11B and 11D, an alternate travel path may be taken where guide pin is directed past the upper interior formation 528a, 728a and upward force on door 520, 720 is maintained. Under such conditions, the track may continue to move upward relative the guide pin with the guide pin being directed along a second path into recess R along the lower interior formation 528b, 728b at the bottom section B of the track. When recess R is engaged and supported on the guide pin, door 520, 720 may be retained in the closed position and such engagement may prevent the door from rotating downward on its own.

According to the exemplary embodiments shown in FIGS. 11B and 11D, when door 520, 720 is in the closed position, upward force on the door (see e.g. FIGS. 4B and 6B) may translate door 520, 720 upward in the console base and the track may shift upward and disengage from the guide pin at recess R. Such movement may move the track upward with the guide pin being directed into the opposing recess at the bottom of the track perimeter member. Such engagement may restrict further upward rotation of door 520, 720 within the base. As shown schematically in FIGS. 11B and 11D, escape path E may be without features that would restrain the track on the guide pin. Thus, when upward force is withdrawn from door 520, 720, track may move downward around the guide pin, with the guide pin being directed through escape path and upward towards exit path X at the open end of the track system. Such movement may enable door 520, 720 to freely rotate downward under the force of gravity or force generated by a spring and/or damper which may rotate door 520, 720 toward the open position.

As shown schematically in FIG. 11C, a side view of a compartment or door 620 of a console is shown as having a path P6 of travel that guide pin may take through the track on door 620 according to an exemplary embodiment. As shown schematically in FIG. 11C, the track according to an exemplary embodiment may include spaced apart protrusions such as raised interior formations, including a larger formation 628a extending downward through the track and a smaller formation 628b alongside the upper portion of the larger formation 628a. According to the exemplary embodiment shown in FIG. 11C, the larger interior formation 628a may have an integral design featuring opposing upper and lower portions and an elongated midsection. The upper portion of larger interior formation 628a may extend outwardly from the midsection and include a hook J under the bottom edge of the upper portion. As shown schematically in FIG. 11C, the elongated midsection of the larger interior formation 628a may depend downward from the upper portion may curve or bend as it extends downward along the interior of the track.

As shown schematically in FIG. 11C, hook J may be configured to engage and be supported by the guide pin when the door 620 of the console is in the interior position and may retain the track (and door) from rotating downward. The lower portion of the larger interior formation 628a may be integral with the midsection portion and may include an enlarged irregular-shaped portion having a bottom edge forming a recess R. As shown schematically in FIG. 11C, the recess R may be positioned above the upward extending ridge of the perimeter member of the track.

As shown schematically in FIG. 11C, the smaller interior formation 628b may be positioned near the upper portion of the larger formation 628a opposite hook H. As shown schematically in FIG. 11C, the smaller formation may be generally fin-shaped featuring a curved sides.

As shown schematically in FIG. 11C, the larger and smaller interior formations 628a, 628b according to an exemplary embodiment may be detached from one another with the slotted channel of track extending between the formations. According to the exemplary embodiment shown in FIG. 11C, the portion of the slotted channel adjacent the smaller interior formation 628b (opposite the larger formation 628a) may provide an escape path E which may continue upward through exit path X at the top of the track.

According to the exemplary embodiment of FIG. 11C, rotation of door 620 may move the track relative the guide pin, with the guide pin being directed into different locations along the travel path P6. For example, as the console door is pushed or urged to rotate upward from the intermediate position, the track may shift upward relative the guide pin and disengage from the guide pin at hook H. Where upward force on the storage compartment door is maintained, the guide pin may be directed between the interior formations 628a, 628b and into the midsection M of the track.

According to the exemplary embodiment shown in FIG. 11C, upon direction of the guide pin towards the lower portion of the larger interior formation 628a, alternate travel paths for the guide pin may be provided. For example, where upward force on door 620 is withdrawn (see e.g. FIGS. 5A through 5E), the track may be permitted to move downward around the guide pin, with guide pin being directed along a first path through escape path E around the return side of the smaller interior formation 628b (opposite the side facing larger formation 728a). From escape path E, door 620 may continue to rotate downward with guide pin being directed out of track through exit path X at the top of the track. Such movement may enable door 620 of the console to rotate downward to the open position.

According to the exemplary embodiment shown in FIG. 11C, where the guide pin reaches the lower portion of the larger interior formation 628a and upward force on door 620 is maintained, the track may continue to move upward relative the guide pin, with the guide pin being directed along a second path where it may engage recess R along the bottom edge of the larger interior formation 628a. When recess R is engaged and supported on the guide pin, door 620 may be retained in the closed position and such engagement may prevent door 620 from rotating downward on its own.

According to the exemplary embodiment shown in FIG. 11C, where door 620 is in the closed position, upward force on the door 620 (see e.g. FIGS. 4B and 6B) may rotate door 620 upward in the console base and the track may shift upward and disengage the guide pin at recess R. Such rotation may move the track upward until guide pin is directed and engaged within the opposing recess at the bottom of the track perimeter member. Engagement of the guide pin in opposing recess at the bottom of the track perimeter member may restrict further upward rotation of door 620 within the base. As shown schematically in FIG. 11C, exit path X2 may be without features that would restrain the track on the guide pin. Thus, when guide pin is seated in the recess along the bottom section B of the track and upward force on door 620 is withdrawn, door 620 may be permitted to freely rotate downward with the track moving downward around the guide pin from the bottom section B through exit path X2 at the open top end of the track. Such movement may enable door 620 to freely rotate downward under the force of gravity or force generated by a spring and/or damper which may force door 620 toward the open position.

Figure 12A:
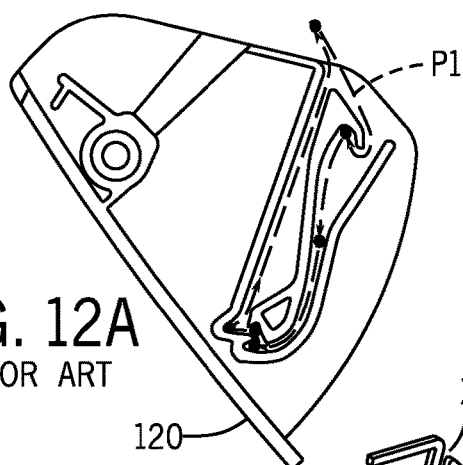
FIG. 12A is a schematic elevation view of an overhead storage compartment door showing a path of a mechanism.
Figure 12B:
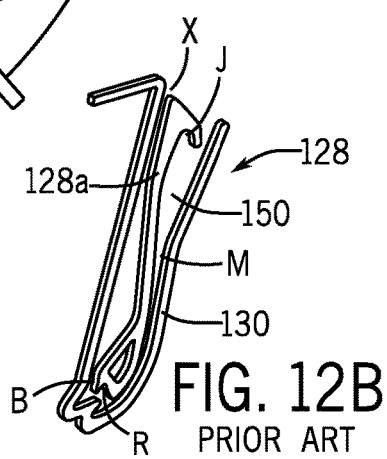
FIG. 12B is a schematic perspective view of the mechanism shown in FIG. 12A.

As shown schematically in FIG. 12A, a side view of a compartment or door 120 or compartment of a console is shown having a path P1 of travel that the guide pin may take through the track on door 120 according to an embodiment representative of a conventional conversation mirror. As shown schematically in FIG. 12B, a corresponding detail view is shown of track 128 of FIG. 12A. As shown in FIGS. 12A and 12B, the track system on the side panel of door 120 may be configured to guide movement of the door 120 or compartment relative the base of console.

As shown schematically in FIGS. 12A and 12B, track 128 may comprise a slotted or recessed channel 150 defined by an interior edge of a perimeter member 130 and the outer edge of a protrusion such as raised formation 128a within the interior of the track (inside the perimeter member). As shown in FIGS. 12A and 12B, the perimeter member 130 may have an integral design featuring an open top end having an opening between two generally downwardly depending side arms that are joined together at a bottom end. The open top end may additionally have a flange extending outwardly from one side arm opposite the opening. The bottom end of the perimeter member 130 may have a jagged configuration (generally resembling a W-shape) featuring an upward extending ridge positioned between recessed troughs on opposing sides of the ridge.

As shown schematically in FIGS. 12A and 12B, a protrusion such as raised interior formation 128a may have an integral design featuring opposing upper and lower portions and an elongated midsection. The upper portion of the interior formation 128a may include an angled top edge and an arm extending from the top edge. The elongated midsection of the interior formation may depend downward from the upper portion and comprise a narrow strip between opposing side edges. As shown schematically in FIGS. 12A and 12B, the elongated midsection may be slightly angled or bend as it extends downward along the interior of the track 128.

As shown schematically in FIGS. 12A and 12B, an inverted hook J may be defined below the upper portion of the interior formation 128a and the elongated midsection. Hook J may be configured to engage and be supported by the guide pin when the door of the storage compartment is in the intermediate mirror position and may prevent the track 128 (and door) from rotating downward. The lower portion of the raised interior formation 128a may be integral with the elongated midsection and may include an enlarged irregular-shaped loop having an angled bottom edge and a downward-extending projection, which together may form a recess R. As shown schematically in FIGS. 12A and 12B, the angled bottom edge of the lower portion may be positioned above the upward extending ridge of the perimeter member 130.

According to an embodiment as shown in FIGS. 12A and 12B, rotation and movement of the door of the console may move the track 128 relative the guide pin, with such rotation being guided by movement of the track system on the door directing the guide pin into different locations along the travel path P1. For example, as the door of the console is pushed or rotated upward from the intermediate position, the track 128 may disengage from the guide pin at hook J and move upward relative the guide pin with the midsection of the track M riding along the guide pin. Where the door of the console is rotated further upward, the track 128 may continue to move relative the guide pin with the slotted channel 150 of track 128 moving around the guide pin such that guide pin is directed from a position along the midsection of track M into recess R along the bottom edge of the raised interior formation 128a. When recess R is engaged and supported on the guide pin, the storage compartment door may be retained in the closed position and such engagement may prevent the door from rotating downward on its own.

According to an embodiment as shown in FIGS. 12A and 12B, when the door of console is retained in the closed position, upward force on the door (see e.g. FIGS. 4B and 6B) may rotate the door upward in the base and the track 128 may disengage the guide pin at recess R, with the guide pin being seated in the opposing recess at the bottom of the perimeter member 130 along the bottom section B of the track 128. Such engagement may restrict further upward rotation of the door within the base.

According to an embodiment as shown in FIGS. 12A and 12B, from the bottom section B, the slotted channel 150 of track may provide an exit path X that may extend upward without features that may restrain the track 128 on the guide pin. Thus, when the guide pin is seated in the recess along the bottom section B of the track 128 and upward force on the door is withdrawn, the track 128 may be released and move downward around the guide pin from the bottom section B through exit path X. According to an embodiment as shown in FIGS. 12A and 12B, such movement may enable the door of the console to freely rotate downward under the force of gravity or force generated by a spring and/or damper which may urge the door downward toward the open position. As shown schematically in FIGS. 12A and 12B, the track 128 according to an exemplary conventional embodiment (unlike the track shown and described above in FIGS. 4-6) comprises a one-piece protrusion or raised interior formation without a gap for providing switch or escape path toward exit path X.

Figure 12C:
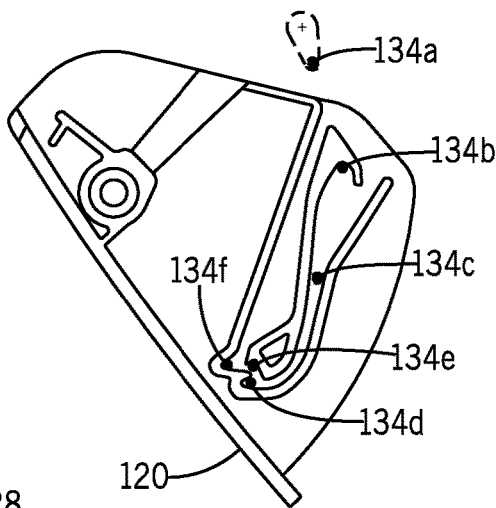
FIG. 12C is a schematic elevation view of a conventional mechanism of an overhead storage compartment door.
Figure 12D:
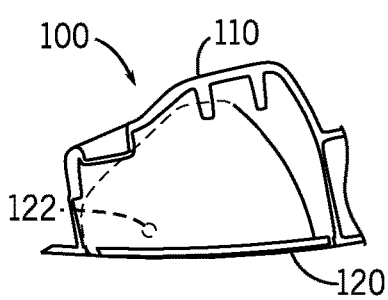
FIGS. 12D to 12H are schematic cross-section views of a conventional overhead storage compartment with the door shown in different positions.
Figure 12E:
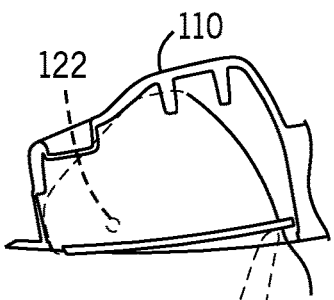
Figure 12F:
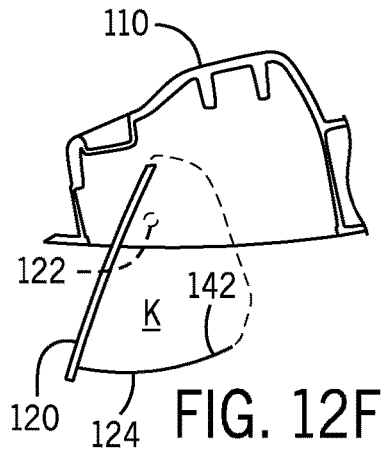

As shown schematically in FIG. 12C, a sequence of positions of compartment or door 120 relative the guide pin is shown according to an embodiment representative of a conventional console. According to the embodiment shown in FIG. 12C, when door 120 is in the opened position 134*a*, it may be fully disengaged from the guide pin. With upward rotation of door 120 from the opened position 134*a* to the intermediate mirror position 134*b*, the guide track of door 120 may engage the guide pin. When door 120 has been rotated into a position near transitional position 134*c* and upward force on the door 120 is withdrawn, door 120 may rotate downward until it settles in the intermediate mirror position—with the guide pin at location 134*b*.

As shown schematically in FIG. 12C, as door 120 is rotated upward from the intermediate mirror position 134*b*, the track of door 120 may disengage from the guide pin at the intermediate mirror position 134*b* and move upward relative the guide pin. Door 120 may proceed through transitional position 134*c* and may continue to rotate upward until it reaches over-travel position 134*d* where the guide pin may be seated in a recess along the perimeter member of the guide track. Such engagement may retain door 120 from rotating further upward. With release of upward force on door 120 at the over-travel position 134*d*, door 120 may rotate downward and settle into the closed position 134*e* with the guide pin engaged in the recess along the bottom edge of the raised interior formation at 134*e*. Such engagement may restrain the door 120 from rotating downward on its own from the closed position.

As shown schematically in FIG. 12C, when door 120 is in the closed position at 134*e*, upward force on door 120 (see e.g. FIGS. 4B and 4B) may rotate door 120 upward and into a second over-travel position 134*f* where the guide pin is seated within the opposing recess at the bottom of the track's perimeter member. Such engagement may restrict further upward rotation of the door 120 within the base. When door 120 is in the second over-travel position 134*f* and upward force is withdrawn, door 120 may be permitted to freely rotate downward under the force of gravity or force generated by a spring and/or damper which may rotate door 120 downward back toward the opened position 134*a*.

As shown schematically in FIGS. 12D through 12H, a console 100 is shown having a rotatable door 120 according to conventional embodiments. As shown schematically in FIG. 12D, console 100 is comprised of a base 110 and a door 120 providing a bin for an article (such as sunglasses) according to a conventional embodiment. Door 120 may be coupled to base 110 at a pivot point 122 and pivot point 122 is configured to facilitate rotation of door 120 relative base 110. As shown schematically in FIG. 12E, hand H of an occupant may push on the bottom of door 120 to an over-travel position to unlatch and open door 120 and to allow door 120 do rotate downward to provide access to the interior bin. As shown schematically in FIG. 12F, door 120 is in an open position being supported by the pivot joint 122. Door 120 and the rear panel 142 of door 120 may form a storage volume, bucket or space K for storage of items. The exterior of the rear panel 142 may provide a mirror surface 124.

Figure 12G:
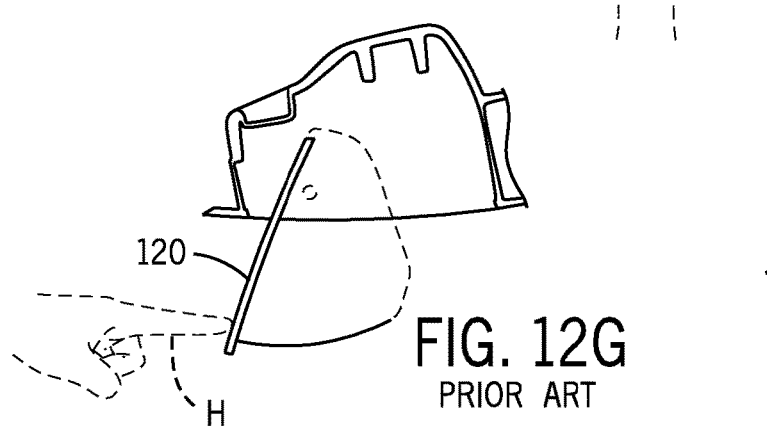
Figure 12H:
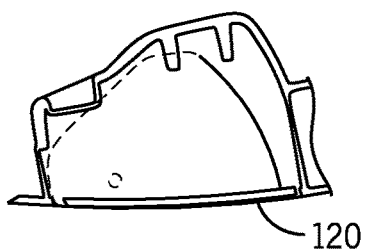

As shown schematically in FIG. 12G, hand H is shown pushing on the bottom face panel of door 120 to move door 120 towards the closed position. As shown schematically in FIG. 12G, hand H may provide an external force to overcome resistance from opposing force from a spring and/or damper. As shown schematically in FIG. 12H, door 120 is shown in the closed position. Items may be stored in the console 100 (and concealed) (behind the closed door) during this stage.

FIGS. 13A through 13E show an overhead console 100 according to a conventional embodiment featuring a conversation mirror. As shown schematically in FIG. 13A, door 120 is shown in the closed position. The track 128 and hinge 126 are shown. In this position, items may be stored in the interior compartment of console 100. As shown schematically in FIG. 13A, the recess formed along a protrusion or raised interior formation of track 128 may rest on the guide pin.

Figure 13A:
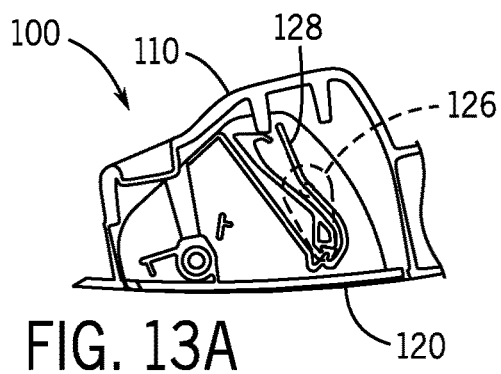
FIGS. 13A to 13H are schematic cross-section views of a conventional overhead storage compartment with the door shown in different positions.
Figure 13B:
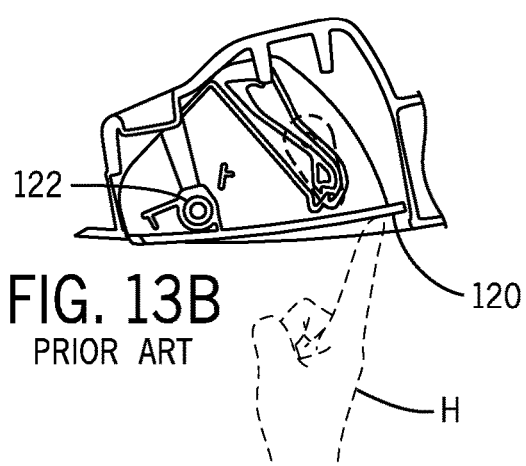

As shown schematically in FIG. 13B, door 120 is shown at an over-travel position as a finger of hand H pushes on door 120 to unlatch and release the door. The guide pin may enter the track at this stage.

Figure 13C:
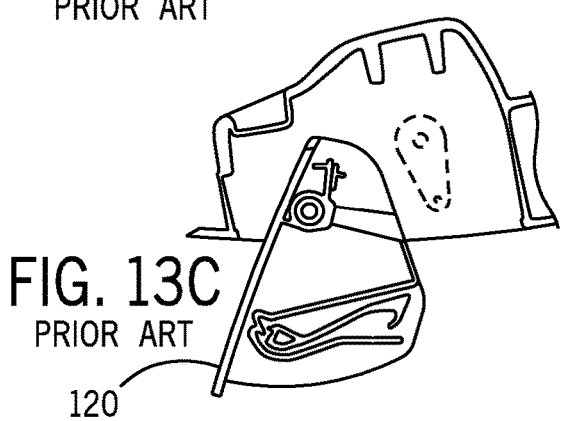

As shown schematically in FIG. 13C, door 120 is shown in a fully opened position. Items may be put into the storage volume K when the door 120 is fully opened. A spring may provide a force to hold door 120 at the fully opened position. A damper may also be provided to control motion for the door 120. At this stage, the guide pin may be separated from the track.

Figure 13D:
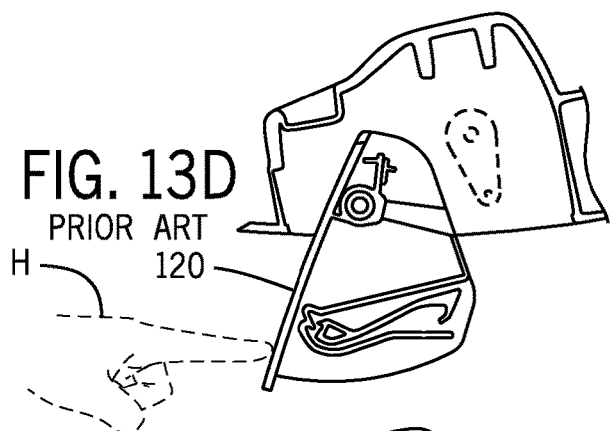

As shown schematically in FIG. 13D, door 120 is shown in a transitional position as it is closing. A finger of hand H may provide a force to overcome resistance from the spring and the damper. The guide pin may enter the track located on the door 120 during where the door is rotating upward towards the closed position.

Figure 13E:
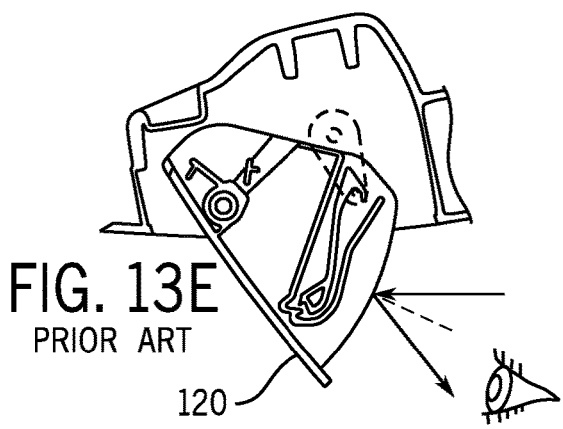

As shown schematically in FIG. 13E, door 120 is shown in an intermediate position with the track of the door hooked on the guide pin. (The hook at the top of the track rests on the guide pin.) As shown schematically in FIG. 13E, where door 120 is retained in the intermediate position, a conversation mirror secured to the exterior of the rear wall of door may be exposed and visible and the driver may see the back seats from the reflection in the conversation mirror.

Figure 13F:
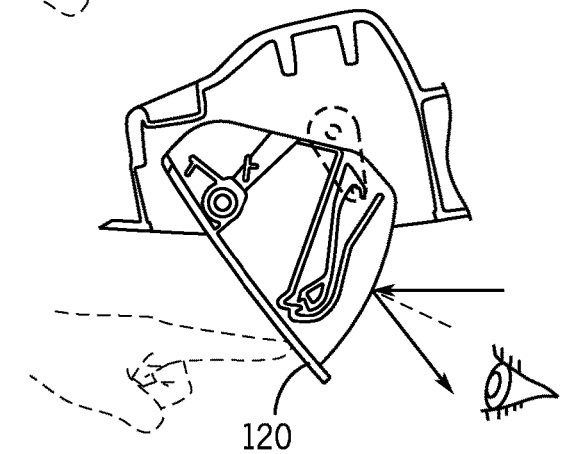

As shown schematically in FIG. 13F, a finger is shown pushing door 120 to unhook from the interior position toward the closed position. As shown in FIG. 13F, as the finger applies external force to door 120, door 120 may rotate upward, and track may move upward relative the guide pin which may be directed along the track toward the lower portion of the track.

Figure 13G:
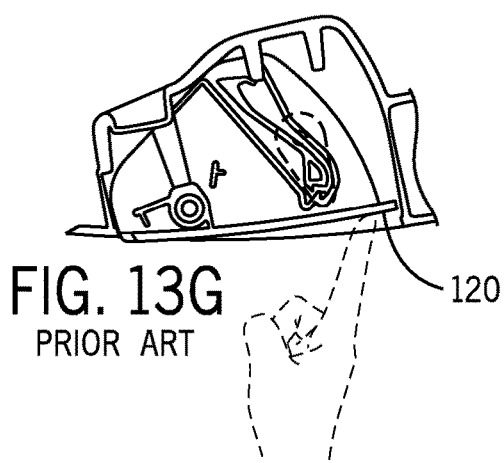

As shown schematically in FIG. 13G, a finger is shown pushing door 120 to an over-travel position to allow door 120 to be latched in the closed position.

Figure 13H:
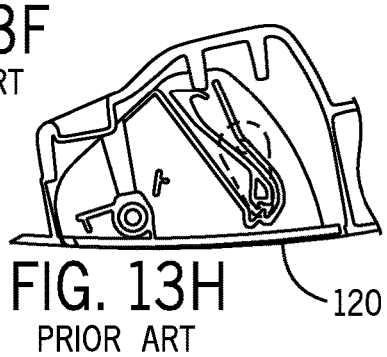

As shown schematically in FIG. 13H, door 120 is shown returning to the closed position. As shown in FIG. 13H, items may be stored/concealed within the interior compartment of the console during this stage. As shown schematically in FIG. 13H, the guide pin may be in a recess at the bottom of the track on door 120. (The door rests on the guide pin at the closed position.)

As shown schematically in FIGS. 14A to 14H, cross-section views of a console 100 is shown with a storage compartment door 120 in various positions and with sunglasses S in the storage volume. As shown schematically in FIG. 14A, door 120 is shown in the closed position. At this state/position, items may be stored in the interior storage volume of console 100. As shown schematically in FIGS. 14A to 14H, a recess formed along a raised interior formation of the track is resting on the guide pin.

As shown schematically in FIG. 14B, door 120 is shown at an over-travel position as a finger of hand H pushes on door 120 to unlatch and release the door. The guide pin may enter the exit path at this stage.

As shown schematically in FIG. 14C, door 120 is shown in a fully opened position. Items may be put into the storage volume K when door 120 is fully opened. A spring may provide a force to hold door 120 at the fully opened position. A damper may also be provided to create a smoother motion for the door 120. At this stage, the guide pin may be separated from the track. (The spring rate of the spring and the damping ratio of the damper may be particularly selected to accommodate the vertical range of movement of the door.)

As shown schematically in FIG. 14D, door 120 is shown in a fully opened position as in FIG. 14C; a pair of large (over-sized) sunglasses S is shown placed inside the storage volume K.

As shown schematically in FIG. 14E, door 120 is shown in a transitional position moving towards the closed position with sunglasses S inside the storage volume K. As shown schematically in FIG. 14E, a finger of hand H may provide a force to overcome resistance to closing (e.g. from the spring and the damper and the weight of the sunglasses S). The guide pin may enter the track located on door 120 during the closing stage.

As shown schematically in FIG. 14F, door 120 is shown in the intermediate mirror position with sunglasses S inside the storage bin of door 120. The door 120 may be hooked on the guide pin at the intermediate position. As shown schematically in FIG. 14F, a hook at the top portion of the track may rest on the guide pin. At the intermediate position, a mirror surface provided on exterior side of the rear panel of door 120 may be visible and a driver may be able see the back seats from the reflection on the conversation mirror. As shown schematically in FIG. 14F, a finger is shown pushing door 120 to unhook it from the conversation mirror position and rotate it toward the closed position. As shown in FIG. 14F, door 120 (and track on the door) may begin to move upward and guide pin may be directed toward the bottom of the track.

As shown schematically in FIG. 14G, door 120 is shown in an obstructed position with a finger continuing to push door 120 toward the closed position. The pair of sunglasses S is so large that it will not allow door 120 to close. According to an exemplary embodiment as shown in FIG. 14G, the guide pin may still be within the entry path of the track.

As shown schematically in FIG. 14H, door 120 is shown in a position where it has not opened but instead has returned to the interior mirror position. According to the embodiment shown in FIG. 14H, the hook within the top portion of the track may rest on the guide pin. At the interior position, the driver may be able to see the back seats from the reflection L on the conversation mirror. At this stage, door 120 is shown to be trapped at the interior position. As shown schematically in FIG. 14H, the pair of sunglasses S is not accessible from the console 100. (The door will require a separate action to open.)

As shown schematically in FIGS. 14A to 14H, a conventional console is shown having a single closed loop track. To open door 120, the door 120 has to pass the closed position; to close door 120, the door 120 has to pass the intermediate position. As shown schematically in FIGS. 14A to 14C, door 120 for a compartment may be opened and closed when the storage space K is empty. As shown schematically in FIG. 14D, a pair of sunglasses S is shown as being placed within the space K. As shown schematically in FIGS. 14E and 14G, with a pair of oversized sunglasses S in the storage space K, door 120 will not be able to close fully (e.g. the sunglasses S obstruct the door 120 from closing entirely, trapping door 120 at the intermediate position). Attempting to open or close door 120 by force may damage the mechanism of the storage compartment or the item within the storage volume.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A console for a vehicle interior comprising:
   (a) a base; and
   (b) a bin coupled to the base for movement to (1) a first state with the bin retained in a closed position; (2) a second state with the bin released from the closed position; (3) a third state with the bin in an open position providing access to a storage volume; (4) a fourth state with the bin retained in an intermediate position blocking access to the storage volume;
   wherein the bin is configured for movement (1) from the intermediate position to the open position and (2) from the intermediate position to the closed position.

2. The console of claim 1 wherein the bin is configured for movement from the intermediate position to the closed position without first moving from the intermediate position to the open position.

3. The console of claim 1 further comprising a mechanism to guide movement of the bin relative to the base; wherein the mechanism comprises a pin configured to travel in a track; wherein the track comprises (a) a first path of movement for the pin to guide the bin for movement from the intermediate position to the open position and (b) a second path of movement for the pin to guide the bin for movement from the intermediate position to the closed position.

4. The console of claim 1 wherein the base comprises a projection; wherein the bin comprises a first protrusion and a second protrusion; wherein the first protrusion comprises a first wall segment and the second protrusion comprises a second wall segment; wherein a gap is provided between the first wall segment and the second wall segment; and wherein the first wall segment and the second wall segment comprise a guide for movement of the bin relative to the base.

5. The console of claim 4 wherein the projection comprises a pin configured to travel through the gap as the bin moves from the intermediate position to the open position; wherein the first protrusion is configured to engage the pin to hold the bin in the closed position and the second protrusion is configured to engage the pin to hold the bin in the intermediate position.

6. The console of claim 1 wherein the base comprises a pin; wherein the bin comprises a first protrusion configured to (a) engage the pin to hold the bin in the closed position and (b) engage the pin to hold the bin in the intermediate position and a second protrusion; wherein the pin is configured to travel between the first protrusion and the second protrusion as the bin moves from the intermediate position to the closed position.

7. The console of claim 1 wherein the base comprises a pin; wherein the bin comprises a first protrusion configured to (a) engage the pin to hold the bin in the closed position and (b) engage the pin to hold the bin in the intermediate position and a second protrusion; wherein the pin is configured to travel around the second protrusion as the bin moves from the open position to the intermediate position and then to the open position.

8. The console of claim 1 wherein the base comprises a pin; wherein the bin comprises a first protrusion configured to (a) engage the pin to hold the bin in the closed position and (b) engage the pin to hold the bin in the intermediate position and a second protrusion; wherein the second protrusion is configured to guide movement of the pin away from the first protrusion to guide movement of the bin toward the open position.

9. The console of claim 1 wherein the base comprises a projection; wherein the bin comprises a first protrusion and a second protrusion; wherein the first protrusion comprises a wall segment and the second protrusion comprises a block; wherein a path of movement for the pin is provided (1) along the wall segment and (2) between the wall segment and the block; wherein the block comprises a cam surface and the path of movement for the pin is provided along the block.

10. The console of claim 1 wherein the base comprises a pin; wherein the bin comprises a wall segment with a notch and a block with a cam surface; wherein the notch comprises a catch for the pin; wherein the wall segment comprises a guide for the pin.

11. The console of claim 10 wherein the wall segment and the block comprise a guide for movement of the bin relative to the base; wherein the guide comprises (a) a first path of movement for the pin along the wall segment into the notch to guide the bin to the intermediate position from the closed position relative to the base; (b) a second path of movement for the pin along the wall segment into the notch to guide the bin to the intermediate position from the open position relative to the base; (c) a third path of movement for the pin along the wall segment and along the cam surface of the block to guide the bin from the open position to the closed position relative to the base; (d) a fourth path of movement for the pin along the wall segment and along the cam surface of the block to guide the bin from the closed position to the open position.

12. The console of claim 1 further comprising an overhead console providing a mirror directed to a rear seat of the vehicle in the fourth state; and wherein the bin comprises a compartment.

13. A console for a vehicle interior comprising:
   (a) a base; and
   (b) a bin coupled to the base for movement to (1) a first state with the bin retained in a closed position; (2) a second state with the bin released from the closed position; (3) a third state with the bin in an open position providing access to a storage volume; (4) a fourth state with the bin retained in an intermediate position blocking access to the storage volume;
   wherein the bin is configured for movement from the closed position to the open position, from the open position to the intermediate position and from the intermediate position to the open position.

14. The console of claim 13 wherein the bin is configured to provide movement from the intermediate position to the closed position directly; wherein movement from the intermediate position to the closed position does not comprise movement to the open position.

15. The console of claim 13 further comprising a mechanism to guide movement of the bin relative to the base; wherein the mechanism comprises a pin configured to travel in a track; wherein the track comprises (a) a first path of movement for the pin to guide the bin for movement from the intermediate position to the open position and (b) a second path of movement for the pin to guide the bin for movement from the intermediate position to the closed position.

16. The console of claim 13 wherein the base comprises a projection; wherein the bin comprises a first protrusion and a second protrusion; wherein the first protrusion comprises a first wall segment and the second protrusion comprises a second wall segment; wherein a gap is provided between the first wall segment and the second wall segment; wherein the first wall segment and the second wall segment comprise a guide for movement of the bin relative to the base; wherein the projection is configured to travel through the gap as the bin moves from the intermediate position to the open position.

17. The console of claim 13 wherein the base comprises a projection; wherein the bin comprises a first protrusion and a second protrusion; wherein the first protrusion is configured to engage the projection to hold the bin in the closed position and the second protrusion is configured to engage the projection to hold the bin in the intermediate position.

18. A console for a vehicle interior comprising:
(a) a base; and
(b) a bin coupled to the base for movement to (1) a first state with the bin retained in a closed position; (2) a second state with the bin released from the closed position; (3) a third state with the bin in an open position providing access to a storage volume; (4) a fourth state with the bin retained in an intermediate position blocking access to the storage volume;
wherein the base comprises a projection;
wherein the bin comprises a first protrusion and a second protrusion;
wherein a gap is provided between the first protrusion and the second protrusion;
wherein the projection is configured to travel through the gap as the bin moves from the intermediate position to the open position.

19. The console of claim 18 wherein the first protrusion is configured to engage the projection to retain the bin in the closed position and the second protrusion is configured to engage the projection to retain the bin in the intermediate position.

20. The console of claim 18 wherein the projection is configured for movement between (a) a disengaged position and (b) a first engaged position with the first protrusion and (c) a second engaged position with the second protrusion; wherein the projection is configured for movement from the second engaged position to the disengaged position directly without movement from the second engaged position to the first engaged position.

* * * * *